(12) United States Patent
Sugawara et al.

(10) Patent No.: US 11,976,673 B2
(45) Date of Patent: May 7, 2024

(54) BLOWER WITH SILENCER

(71) Applicant: FUJIFILM Corporation, Tokyo (JP)

(72) Inventors: Yoshihiro Sugawara, Ashigarakami-gun (JP); Shinya Hakuta, Ashigarakami-gun (JP); Akihiko Ohtsu, Ashigarakami-gun (JP); Shogo Yamazoe, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 176 days.

(21) Appl. No.: 17/487,189

(22) Filed: Sep. 28, 2021

(65) Prior Publication Data

US 2022/0010813 A1 Jan. 13, 2022

Related U.S. Application Data

(63) Continuation of application No. PCT/JP2020/012600, filed on Mar. 23, 2020.

(30) Foreign Application Priority Data

Apr. 24, 2019 (JP) .................................. 2019-082630

(51) Int. Cl.
*F04D 29/66* (2006.01)
*F04D 19/00* (2006.01)
(Continued)

(52) U.S. Cl.
CPC ......... *F04D 29/665* (2013.01); *F04D 19/002* (2013.01); *F04D 29/522* (2013.01);
(Continued)

(58) Field of Classification Search
CPC .... F04D 19/002; F04D 29/522; F04D 29/663; F04D 29/664; F04D 29/665; G10K 11/16;
(Continued)

(56) References Cited

U.S. PATENT DOCUMENTS 3,949,830 A * 4/1976 Muehlbauer .............. F01N 1/10
181/224
4,313,524 A * 2/1982 Rose ......................... F02C 7/24
181/291
(Continued)

FOREIGN PATENT DOCUMENTS

FR 2 728 028 A1 6/1996
JP 4-265500 A 9/1992
(Continued)

OTHER PUBLICATIONS

Japanese Office Action for corresponding Japanese Application No. 2021-515882, dated May 9, 2023, with English translation.
(Continued)

*Primary Examiner* — Devon C Kramer
*Assistant Examiner* — Joseph S. Herrmann
(74) *Attorney, Agent, or Firm* — Birch, Stewart, Kolasch & Birch, LLP

(57) ABSTRACT

A blower with a silencer has the blower including an axial fan including a casing, a motor attached to the casing, and a rotor having a shaft portion attached to the motor and rotated and a blade formed to protrude to an outer side of the shaft portion in a radial direction, and a silencer attached to the casing, in which the silencer includes a resonator that selectively silences a dominant sound generated by the axial fan, the silencer is disposed at a position in which at least a part of the silencer overlaps with the shaft portion, as viewed from a rotation axis direction of the rotor, and in a case in which, in a cross section perpendicular to a rotation axis of the rotor, a circle around the rotation axis, which has a radius of a line connecting the rotation axis and a point of a most distal end of the blade, is defined as a rotation region, an area of the silencer in the cross section perpendicular to the rotation axis is smaller than an area of the rotation region.

13 Claims, 20 Drawing Sheets

(51) Int. Cl.
  *F04D 29/52* (2006.01)
  *H02K 5/04* (2006.01)
  *H02K 7/00* (2006.01)
  *H02K 7/14* (2006.01)

(52) U.S. Cl.
  CPC ............ *F04D 29/664* (2013.01); *H02K 5/04* (2013.01); *H02K 7/003* (2013.01); *H02K 7/14* (2013.01)

(58) Field of Classification Search
  CPC .......... G10K 11/172; H02K 5/04; H02K 5/24; H02K 7/003; H02K 7/14
  USPC .......................................... 181/291; 417/312
  See application file for complete search history.

(56) References Cited

U.S. PATENT DOCUMENTS

| | | | | |
|---|---|---|---|---|
| 6,988,057 | B2* | 1/2006 | Huang | G10K 11/172 181/269 |
| 8,531,073 | B2* | 9/2013 | Mai | F04D 19/002 310/90 |
| 8,814,501 | B2* | 8/2014 | Shoji | F04D 25/0613 415/214.1 |
| 2005/0161280 | A1 | 7/2005 | Furuya | |
| 2008/0053749 | A1 | 3/2008 | Utsunomiya | |
| 2013/0133978 | A1* | 5/2013 | Borroni | B32B 5/022 181/291 |
| 2016/0177973 | A1 | 6/2016 | Kilian et al. | |
| 2017/0234330 | A1* | 8/2017 | Kelaher | F04D 19/002 415/1 |
| 2017/0292453 | A1* | 10/2017 | Rami | F02C 7/24 |

FOREIGN PATENT DOCUMENTS

| | | | |
|---|---|---|---|
| JP | 10-103728 | A | 4/1998 |
| JP | 2004-117531 | A | 4/2004 |
| JP | 2005-76585 | A | 3/2005 |
| JP | 2008-58389 | A | 3/2008 |
| JP | 2009139556 | A * | 6/2009 |
| JP | 2011-189295 | A | 9/2011 |
| JP | 2011169295 | A * | 9/2011 |
| JP | 2013-167189 | A | 8/2013 |
| RU | 2 659 637 | C1 | 7/2018 |
| WO | WO 2004/061817 | A1 | 7/2004 |

OTHER PUBLICATIONS

Japanese Office Action for corresponding Japanese Application No. 2021-515882, dated Jan. 4, 2023, with English translation.
Extended European Search Report for corresponding European Application No. 20796083.2, dated May 13, 2022.
Chinese Office Action and Search Report for corresponding Chinese Application No. 202080025894.3, dated Apr. 19, 2023, with English translation.
International Preliminary Report on Patentability and English translation of the Written Opinion of the International Searching Authority (Forms PCT/IB/326, PCT/IB/373 and PCT/ISA/237) for International Application No. PCT/JP2020/012600, dated Nov. 4, 2021.
International Search Report (Form PCT/ISA/210) for International Application No. PCT/JP2020/012600, dated Jun. 9, 2020, with English translation.
Japanese Office Action for Japanese Application No. 2021-515882, dated Sep. 6, 2022, with English translation.
European Communication pursuant to Article 94(3) EPC for corresponding European Application No. 20796083.2, dated Dec. 1, 2023.
Chinese Office Action for corresponding Chinese Application No. 202080025894.3, dated Dec. 12, 2023, with English translation.

* cited by examiner

BLOWER WITH SILENCER

CROSS-REFERENCE TO RELATED APPLICATIONS

This application is a Continuation of PCT International Application No. PCT/JP2020/012600 filed on Mar. 23, 2020, which claims priority under 35 U.S.C § 119(a) to Japanese Patent Application No. 2019-082630 filed on Apr. 24, 2019. Each of the above application(s) is hereby expressly incorporated by reference, in its entirety, into the present application.

BACKGROUND OF THE INVENTION

1. Field of the Invention

The present invention relates to a blower with a silencer.

2. Description of the Related Art

In an information device, such as a personal computer (PC), a duplicator, and the like, in order to cool an inside of the device, a fan is used to exhaust heated air in the device.

Out of a noise generated from such a cooling fan, a noise of which a frequency is determined by the number of blades and a rotation speed thereof has a high sound pressure at a specific frequency and a very strong pure tone (tone) component, which is jarring and causes a problem.

In order to reduce such a noise, even in a case in which a porous sound absorbing material generally used for silencing is used, sound volume is uniformly reduced in a wide frequency band. Therefore, in a case in which the sound pressure is high only at a specific frequency as described above, it is difficult to relatively lower the sound pressure of the specific frequency.

In addition, in a case in which the porous sound absorbing material is used, it is necessary to increase a volume thereof in order to obtain a sufficient silencing effect, but since it is necessary to ensure an air volume due to a fan, there is a problem in which a size of the porous sound absorbing material is limited, and thus it is difficult to achieve both high ventilation property and soundproofing performance.

In order to silence such a noise of the fan generated at a specific frequency, it has been proposed to use a resonance type silencer.

For example, WO2004/061817 discloses a silencer including a housing having a flat housing shape and having a passage for performing silencing processing formed therein, and a hole portion formed in the housing to be communicated with the passage and into which a sound wave to be noise are introduced, in which the hole portion is formed on an outer peripheral side of the housing and the sound wave to be noise travel in the surface direction of the housing.

In addition, it is also disclosed that the silencer performs resonance sound absorption.

SUMMARY OF THE INVENTION

As disclosed in WO2004/061817, in a case in which the silencer is installed on an outer peripheral portion of the passage of wind generated by the fan in order to ensure the ventilation property (that is, air volume), since a space for installing the silencer is required, there is a problem in which the entire device in which the fan and the silencer are installed is increased in size.

An object of the present invention is to solve the above-described problems in the related art, to provide a blower with a silencer that can silence a sound of a specific frequency while ensuring an air volume of a fan and can be reduced in size.

The present invention solves the problem by following configurations.

[1] A blower with a silencer, the blower comprising an axial fan comprising a casing, a motor attached to the casing, and a rotor having a shaft portion attached to the motor and rotated and a blade formed to protrude to an outer side of the shaft portion in a radial direction, and a silencer attached to the casing, in which the silencer includes a resonator that selectively silences a dominant sound generated by the axial fan, the silencer is disposed at a position in which at least a part of the silencer overlaps with the shaft portion, as viewed from a rotation axis direction of the rotor, and in a case in which, in a cross section perpendicular to a rotation axis of the rotor, a circle around the rotation axis, which has a radius of a line connecting the rotation axis and a point of a most distal end of the blade, is defined as a rotation region, an area of the silencer in the cross section perpendicular to the rotation axis is smaller than an area of the rotation region.

[2] The blower with a silencer according to [1], in which the silencer is disposed to overlap with the shaft portion as a whole, as viewed from the rotation axis direction.

[3] The blower with a silencer according to [2], in which the area of the silencer in the cross section perpendicular to the rotation axis is 70% or more of an area of the shaft portion.

[4] The blower with a silencer according to [1], in which in a case in which a region excluding a region of the shaft portion from the rotation region, as viewed from the rotation axis direction, is defined as a blade region, an area of a region in which the blade region and the silencer overlap with each other is 52% or less of an area of the blade region.

[5] The blower with a silencer according to any one of [1] to [4], in which a thickness of the silencer in the rotation axis direction is within three times a thickness of the axial fan.

[6] The blower with a silencer according to any one of [1] to [5], in which the silencer includes a plurality of the resonators.

[7] The blower with a silencer according to claim 6, in which any two of the plurality of resonators have different resonance frequencies from each other.

[8] The blower with a silencer according to any one of [1] to [7], in which in a case in which an outward direction of the rotation axis direction is 0° and an inward direction of the rotation axis direction is 180°, an angle of a vibration direction of a vibrating body of the resonator to the rotation axis is within 90°.

[9] The blower with a silencer according to any one of [1] to [8], in which the resonator is a film type resonator that resonates by film vibration.

[10] The blower with a silencer according to any one of [1] to [9], in which the silencer includes a porous sound absorbing material.

According to the present invention, it is possible to provide the blower with a silencer that can silence the sound of the specific frequency while ensuring the air volume of the fan and can be reduced in size.

3

Figure 1:
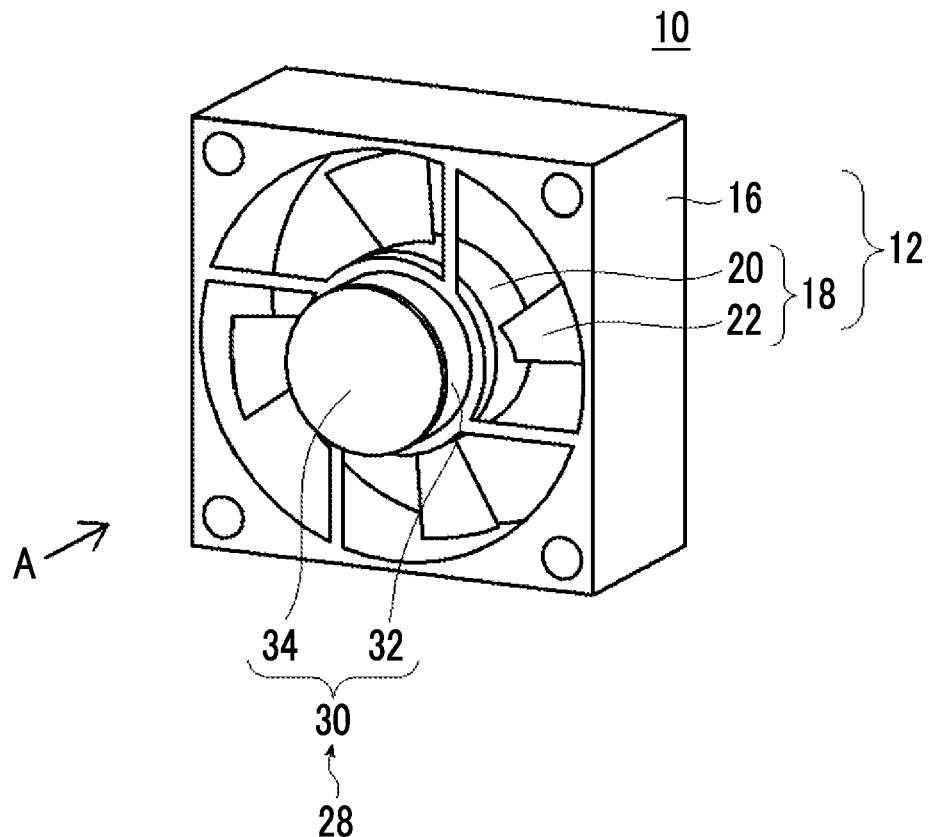
FIG. 1 is a perspective view schematically showing an example of a blower with a silencer according to an embodiment of the present invention.
Figure 2:
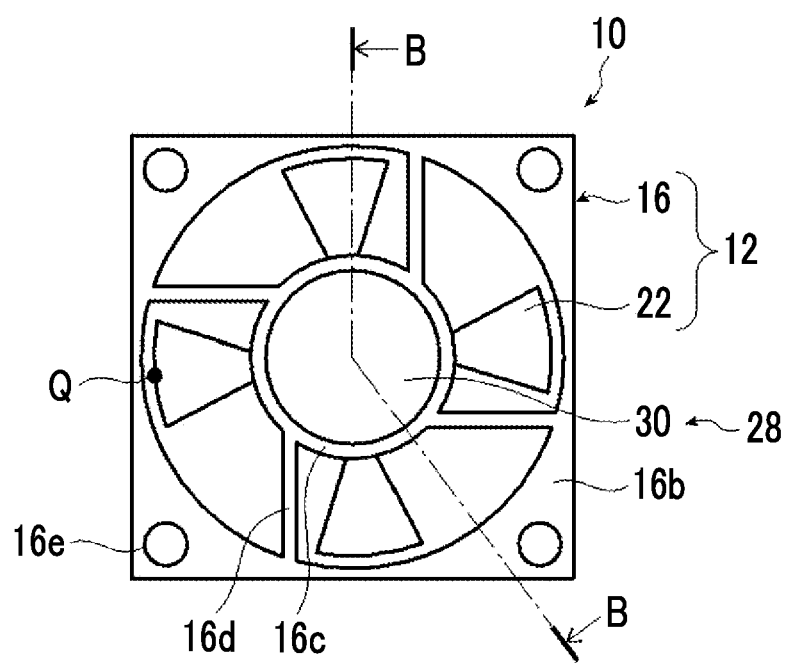

FIG. 2 is a front view of the blower with the silencer of FIG. 1 as viewed from an A direction.

Figure 3:
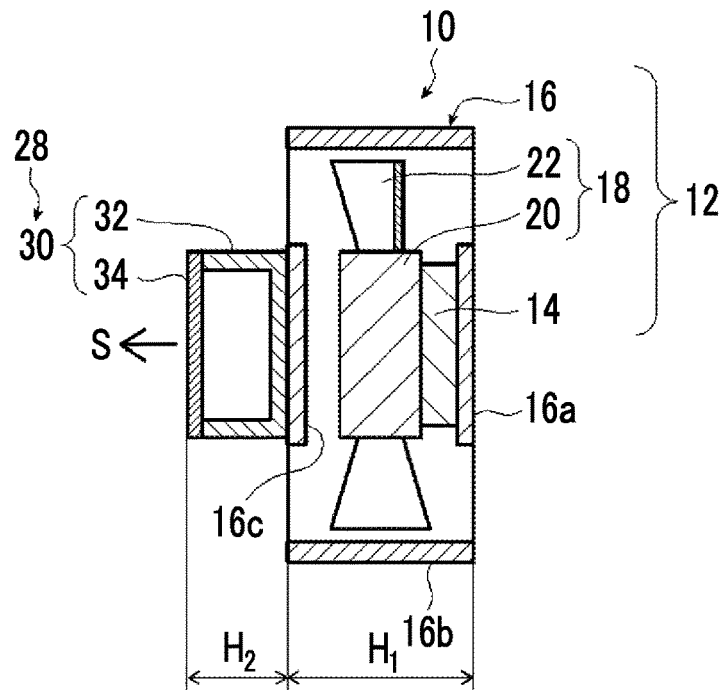

FIG. 3 is a cross-sectional view taken along a line B-B of FIG. 2.

Figure 4:
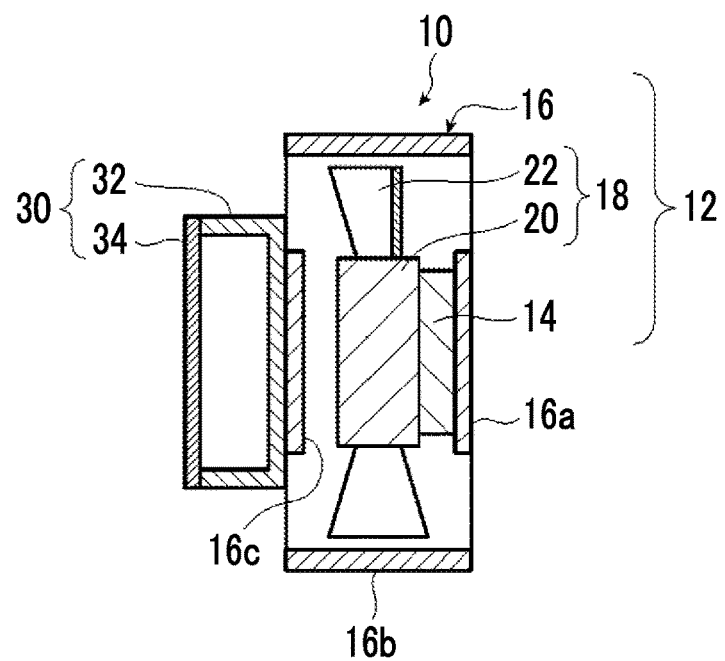

FIG. 4 is a cross-sectional view schematically showing another example of the blower with the silencer according to the embodiment of the present invention.

Figure 5:
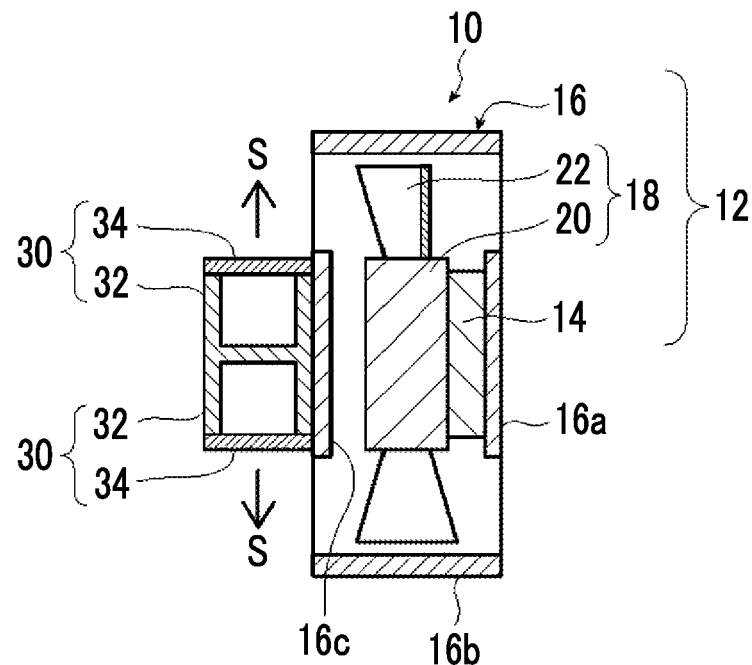

FIG. 5 is a cross-sectional view schematically showing still another example of the blower with the silencer according to the embodiment of the present invention.

Figure 6:
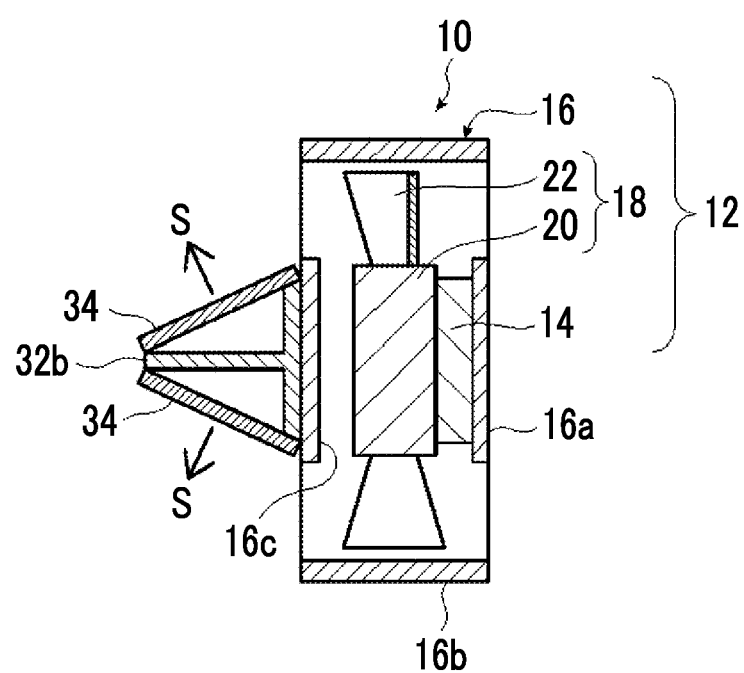

FIG. 6 is a cross-sectional view schematically showing still another example of the blower with the silencer according to the embodiment of the present invention.

Figure 7:
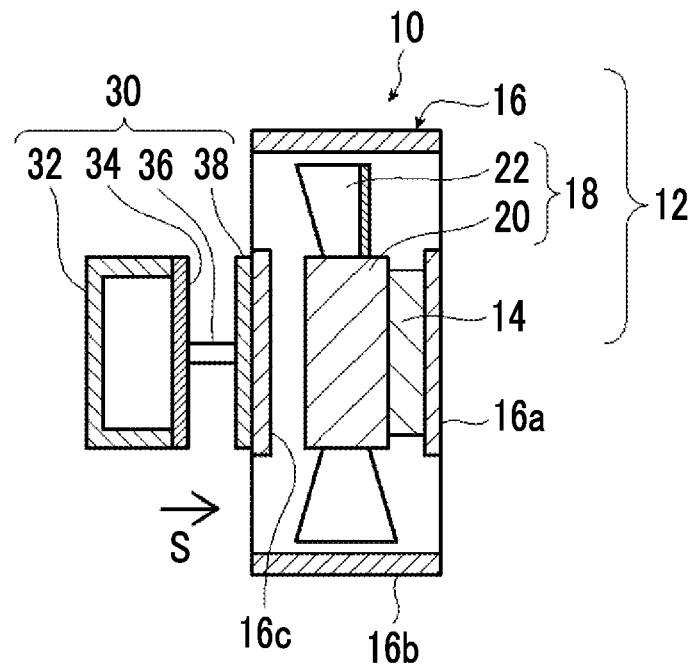

FIG. 7 is a cross-sectional view schematically showing still another example of the blower with the silencer according to the embodiment of the present invention.

Figure 8:
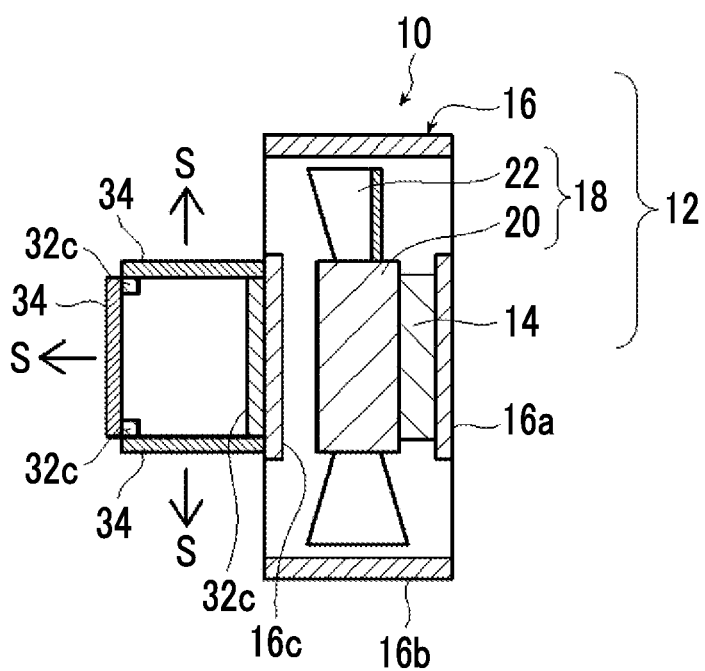

FIG. 8 is a cross-sectional view schematically showing still another example of the blower with the silencer according to the embodiment of the present invention.

Figure 9:
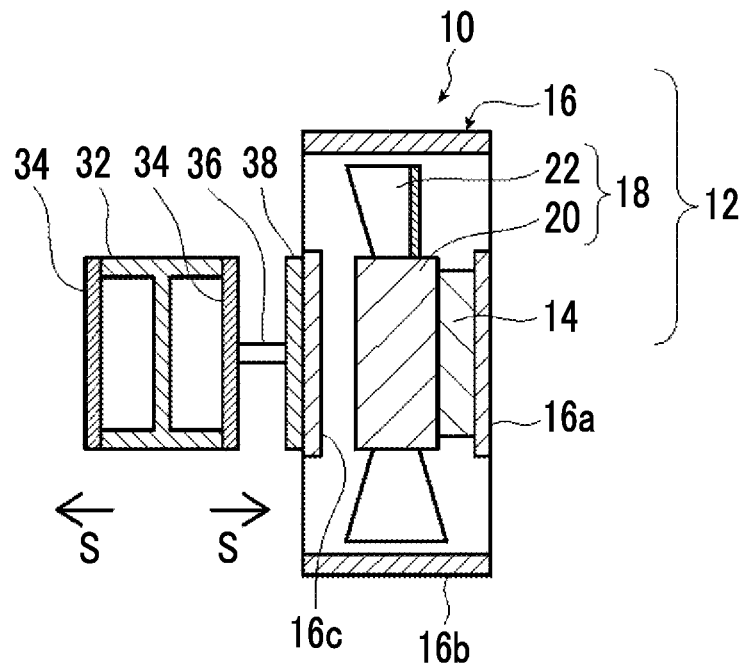

FIG. 9 is a cross-sectional view schematically showing still another example of the blower with the silencer according to the embodiment of the present invention.

Figure 10:
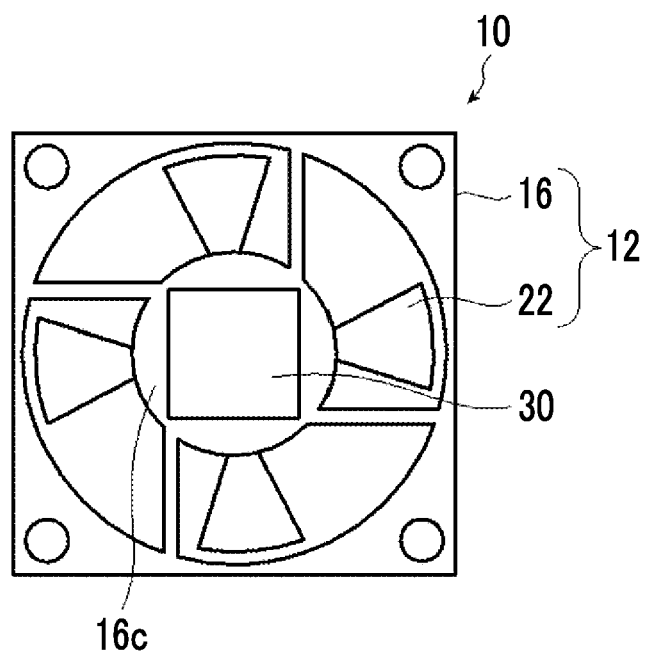

FIG. 10 is a front view schematically showing still another example of the blower with the silencer according to the embodiment of the present invention.

Figure 11:
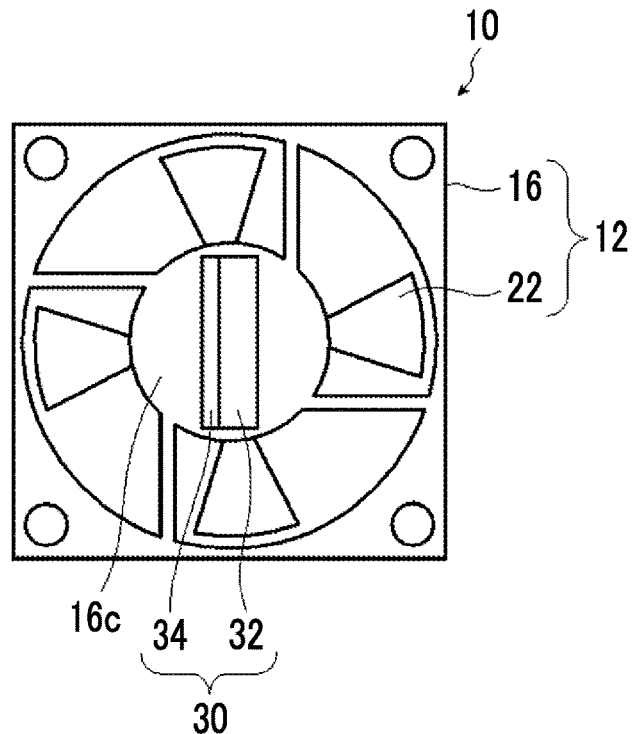

FIG. 11 is a front view schematically showing still another example of the blower with the silencer according to the embodiment of the present invention.

Figure 12:
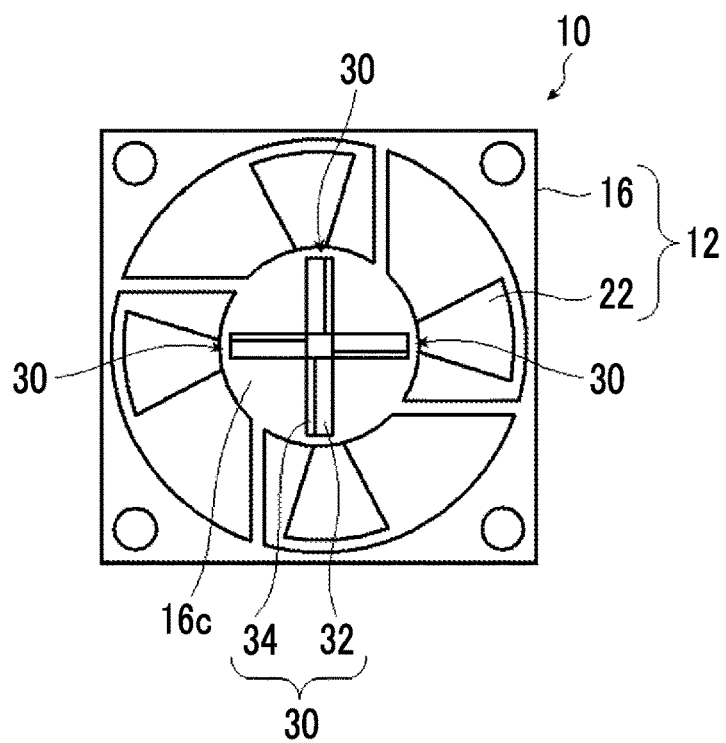

FIG. 12 is a front view schematically showing still another example of the blower with the silencer according to the embodiment of the present invention.

Figure 13:
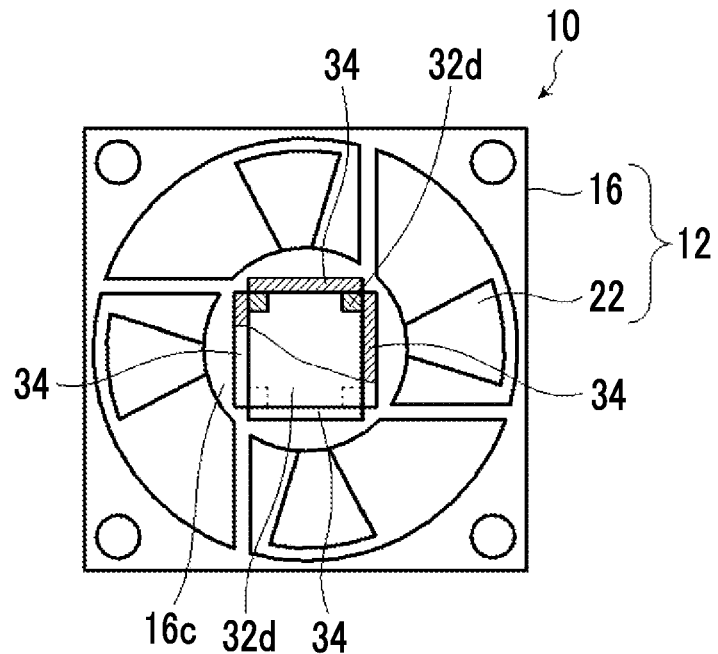

FIG. 13 is a front view schematically showing still another example of the blower with the silencer according to the embodiment of the present invention.

Figure 14:
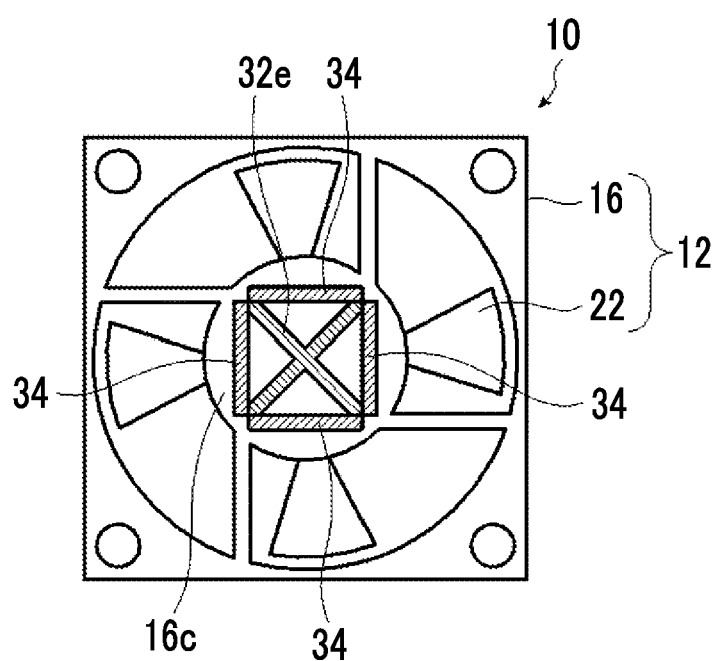

FIG. 14 is a front view schematically showing still another example of the blower with the silencer according to the embodiment of the present invention.

Figure 15:
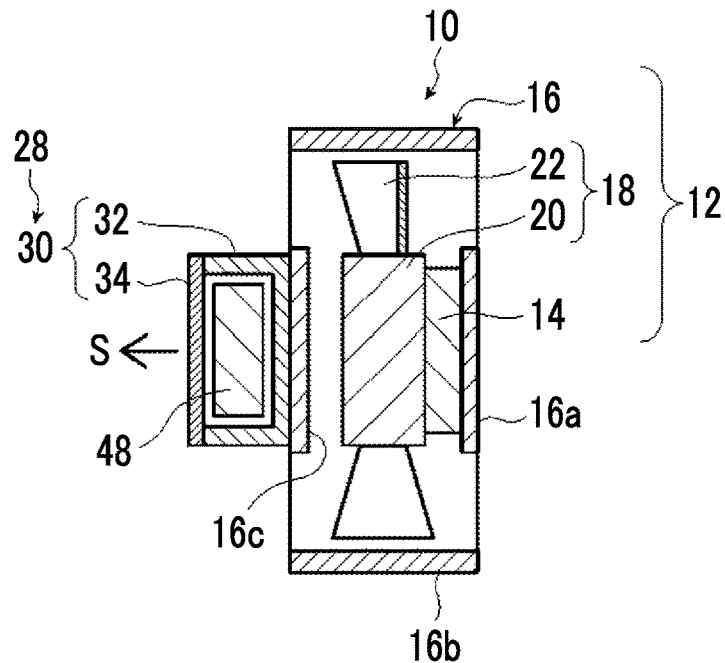

FIG. 15 is a cross-sectional view schematically showing still another example of the blower with the silencer according to the embodiment of the present invention.

Figure 16:
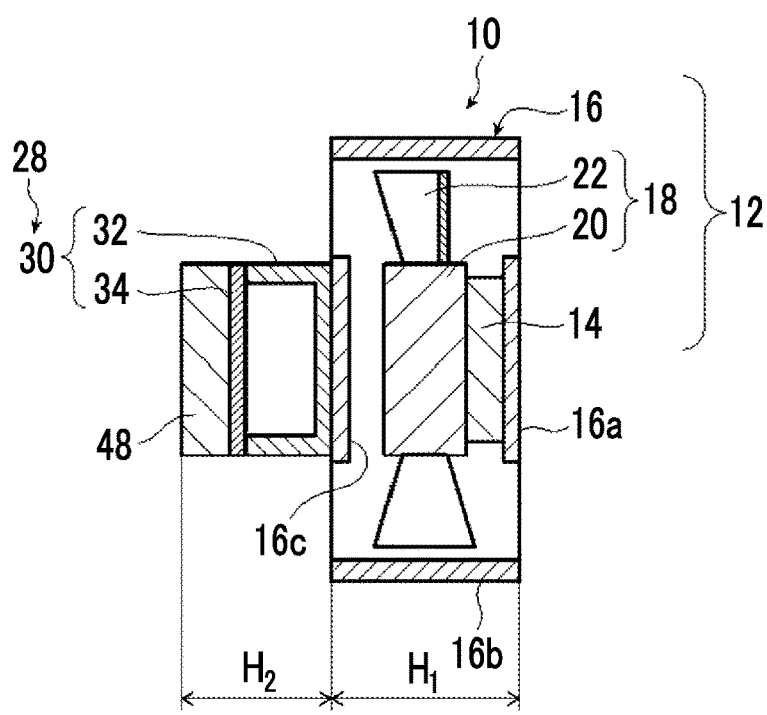

FIG. 16 is a cross-sectional view schematically showing still another example of the blower with the silencer according to the embodiment of the present invention.

Figure 17:
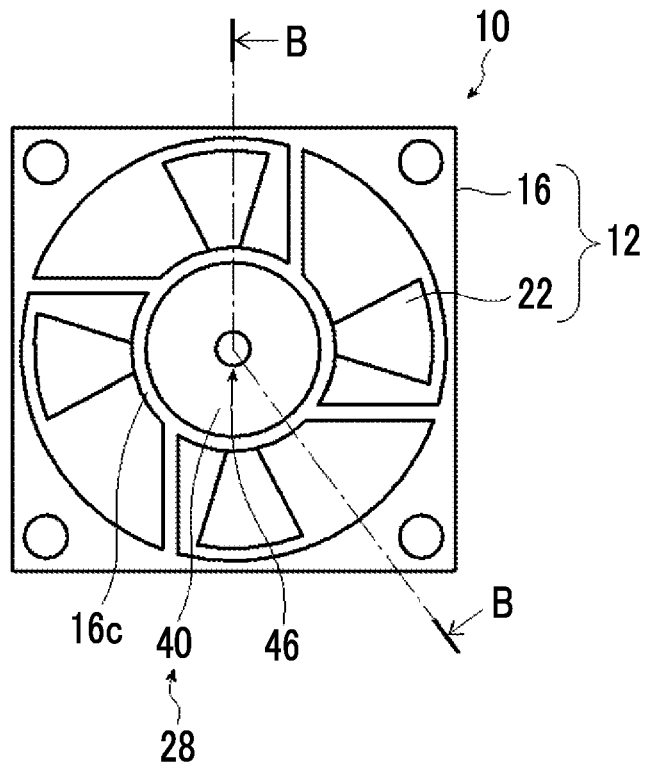

FIG. 17 is a front view schematically showing still another example of the blower with the silencer according to the embodiment of the present invention.

Figure 18:
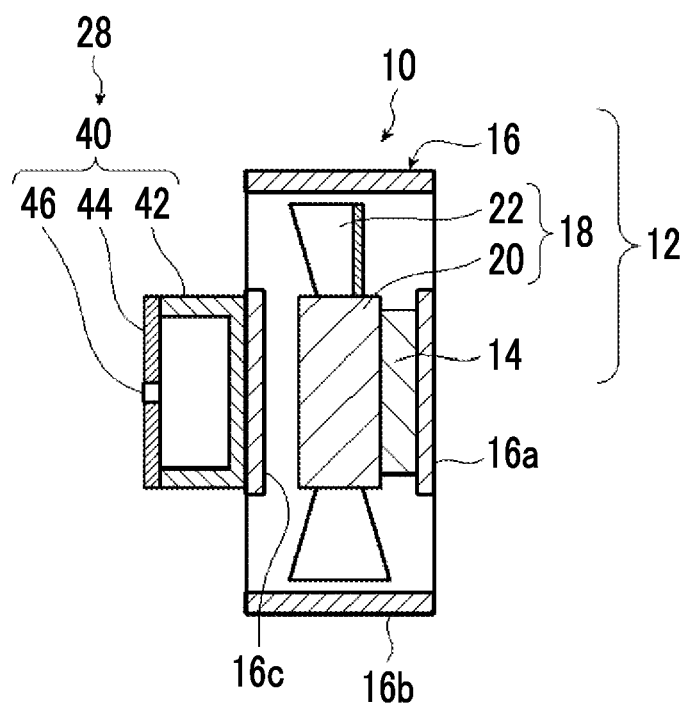

FIG. 18 is a cross-sectional view taken along a line B-B of FIG. 17.

Figure 19:
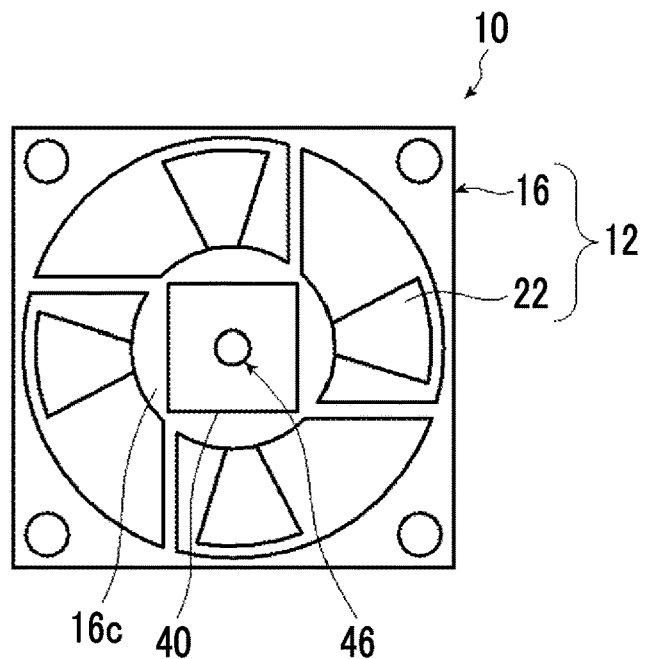

FIG. 19 is a front view schematically showing still another example of the blower with the silencer according to the embodiment of the present invention.

Figure 20:
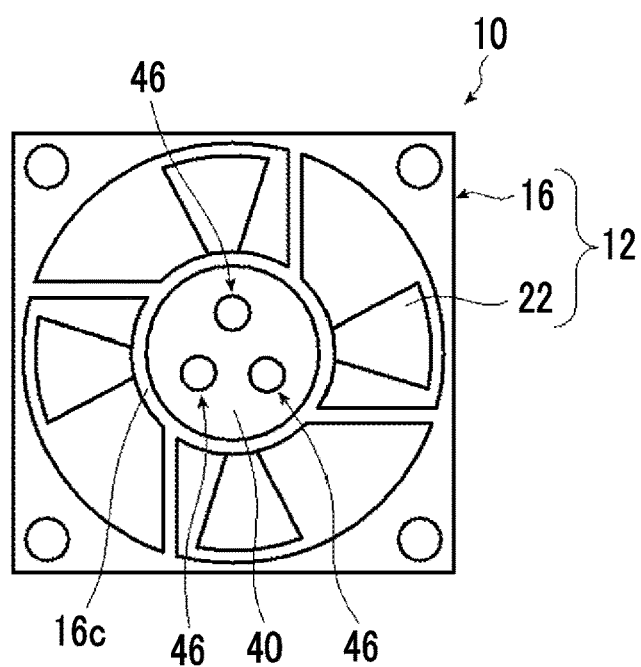

FIG. 20 is a front view schematically showing still another example of the blower with the silencer according to the embodiment of the present invention.

Figure 21:
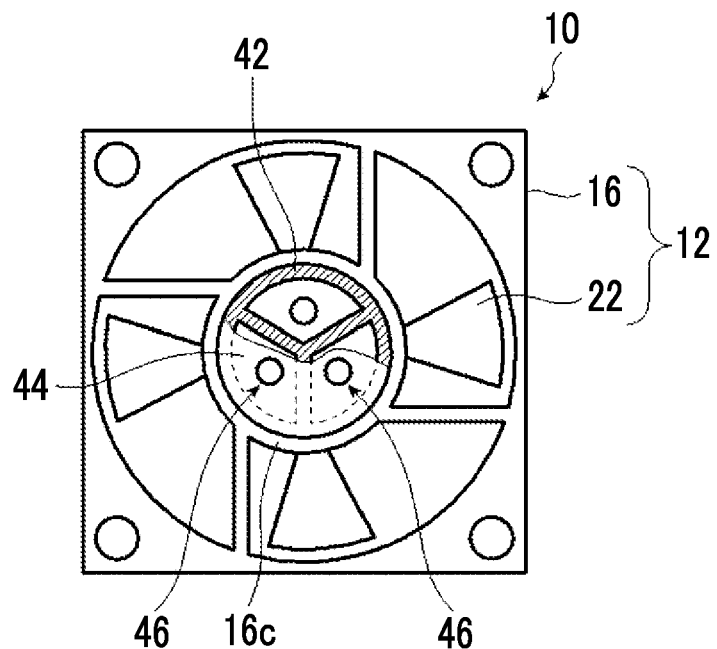

FIG. 21 is a front view schematically showing still another example of the blower with the silencer according to the embodiment of the present invention.

Figure 22:
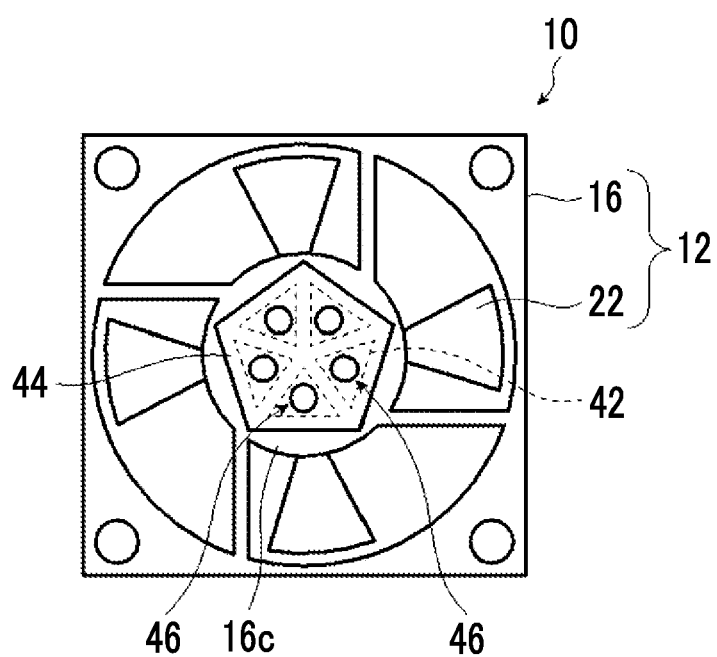

FIG. 22 is a front view schematically showing still another example of the blower with the silencer according to the embodiment of the present invention.

Figure 23:
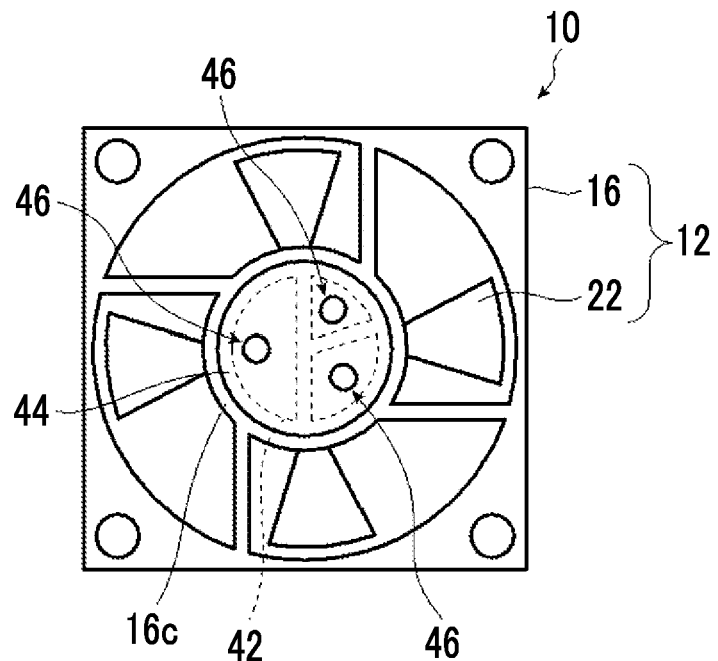

FIG. 23 is a front view schematically showing still another example of the blower with the silencer according to the embodiment of the present invention.

Figure 24:
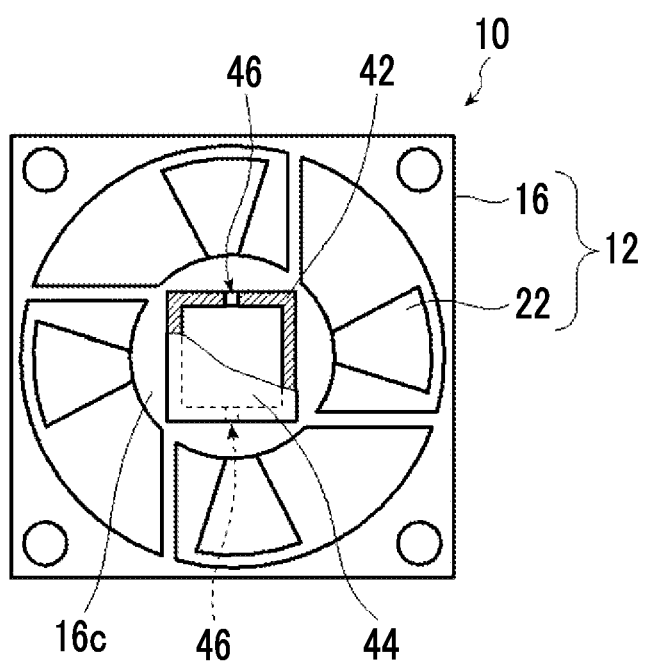

FIG. 24 is a front view schematically showing still another example of the blower with the silencer according to the embodiment of the present invention.

Figure 25:
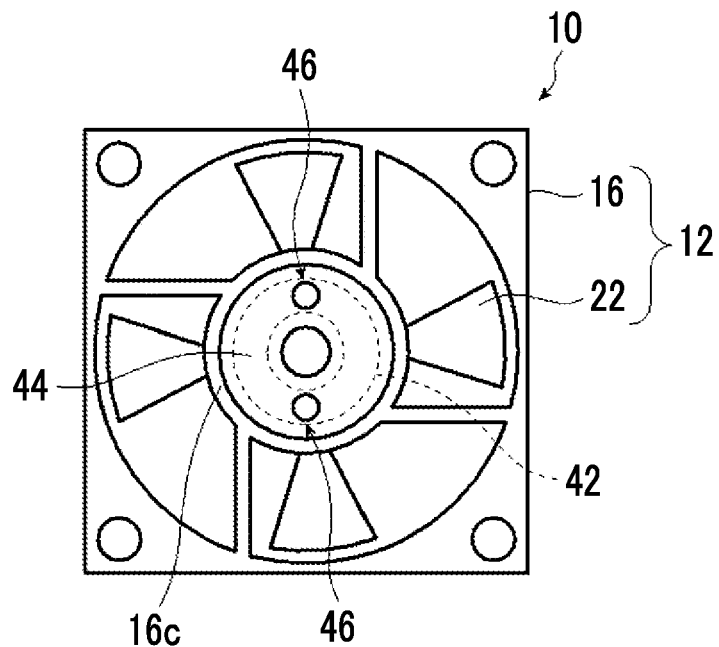

FIG. 25 is a front view schematically showing still another example of the blower with the silencer according to the embodiment of the present invention.

Figure 26:
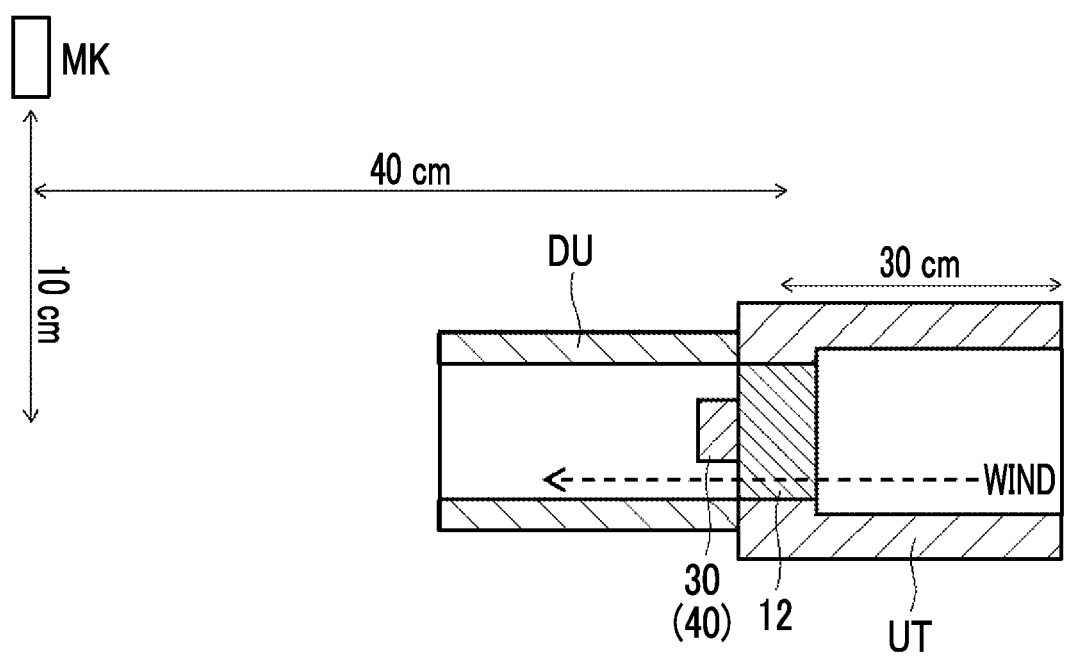

FIG. 26 is a view for describing a measuring method in Examples.

Figure 27:
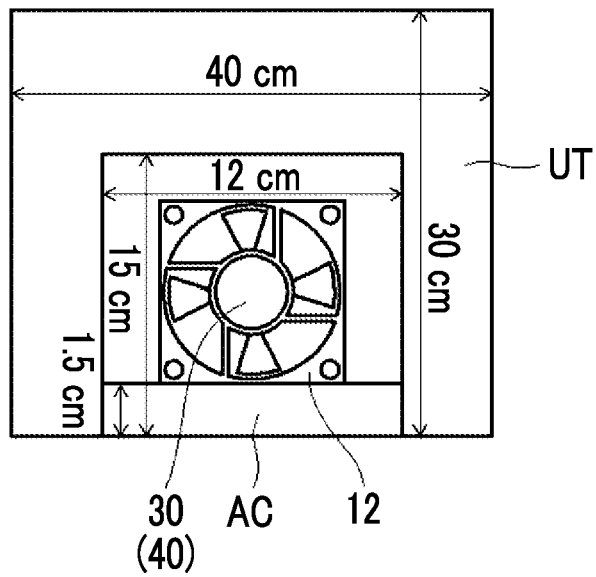

FIG. 27 is a side view of FIG. 26.

Figure 28:
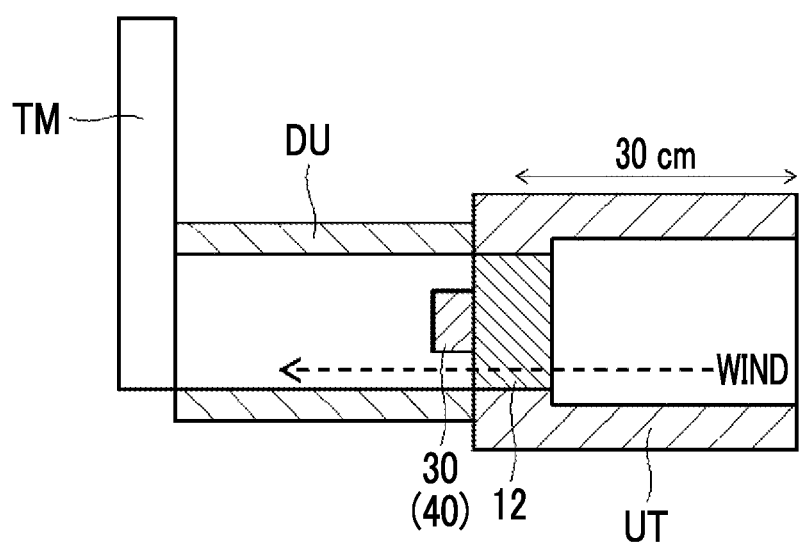

FIG. 28 is a view for describing a measuring method in Examples.

Figure 29:
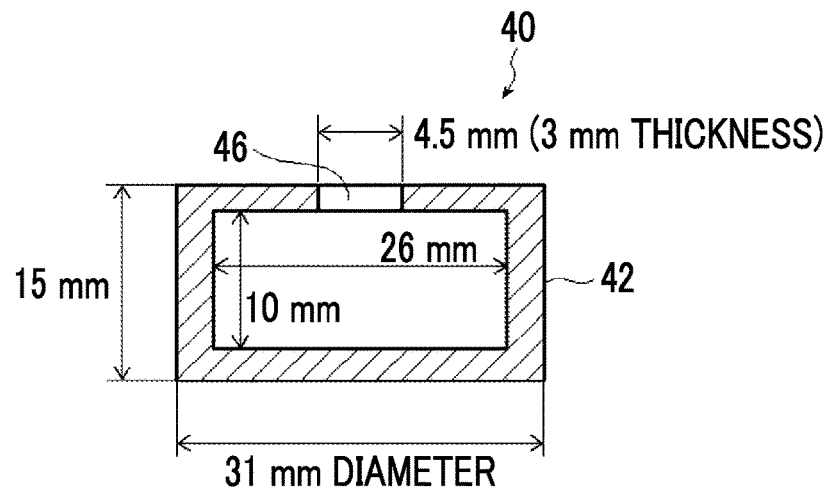

FIG. 29 is a view for describing a configuration of a resonator used in Examples.

Figure 30:
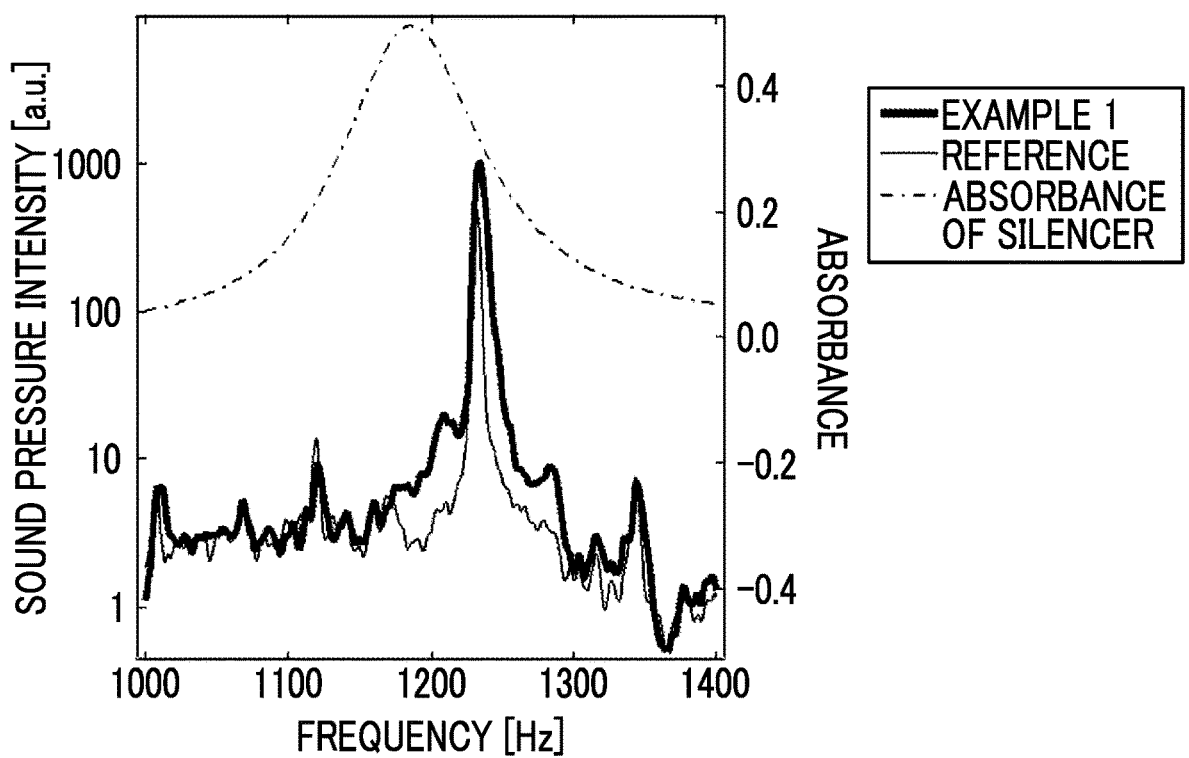

FIG. 30 is a graph showing a relationship between a frequency and a sound pressure intensity and a relationship between the frequency and absorbance.

Figure 31:
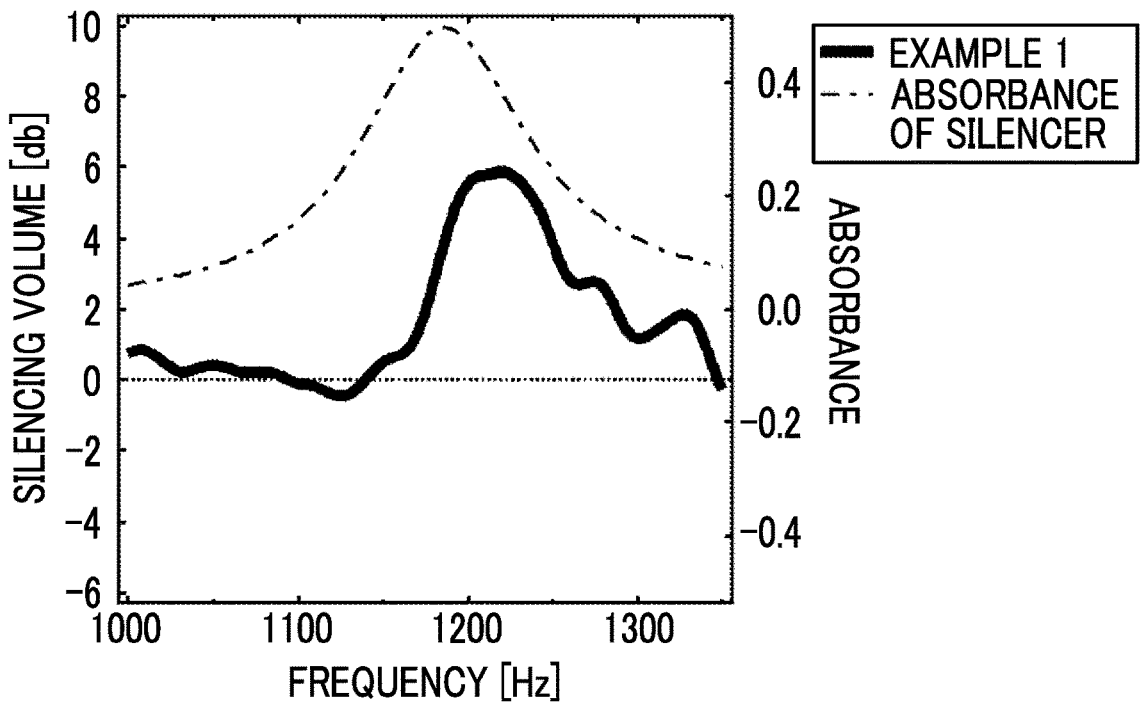

FIG. 31 is a graph showing a relationship between the frequency and a silencing volume and a relationship between the frequency and the absorbance.

Figure 32:
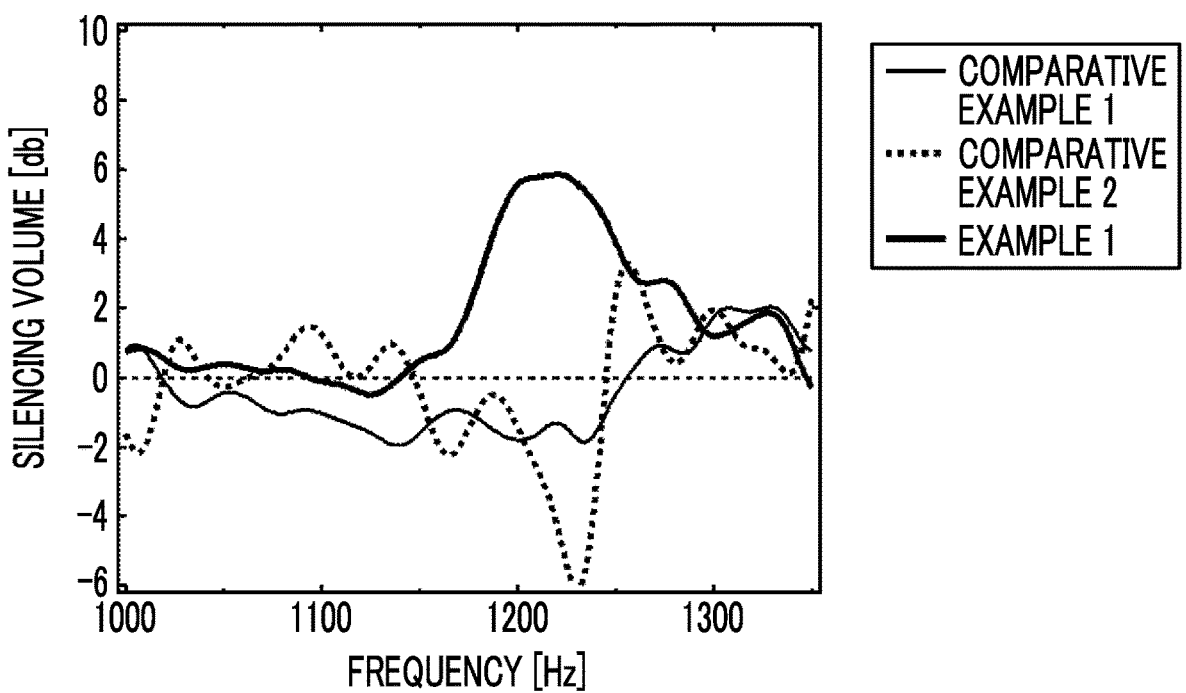

FIG. 32 is a graph showing a relationship between the frequency and the silencing volume.

Figure 33:
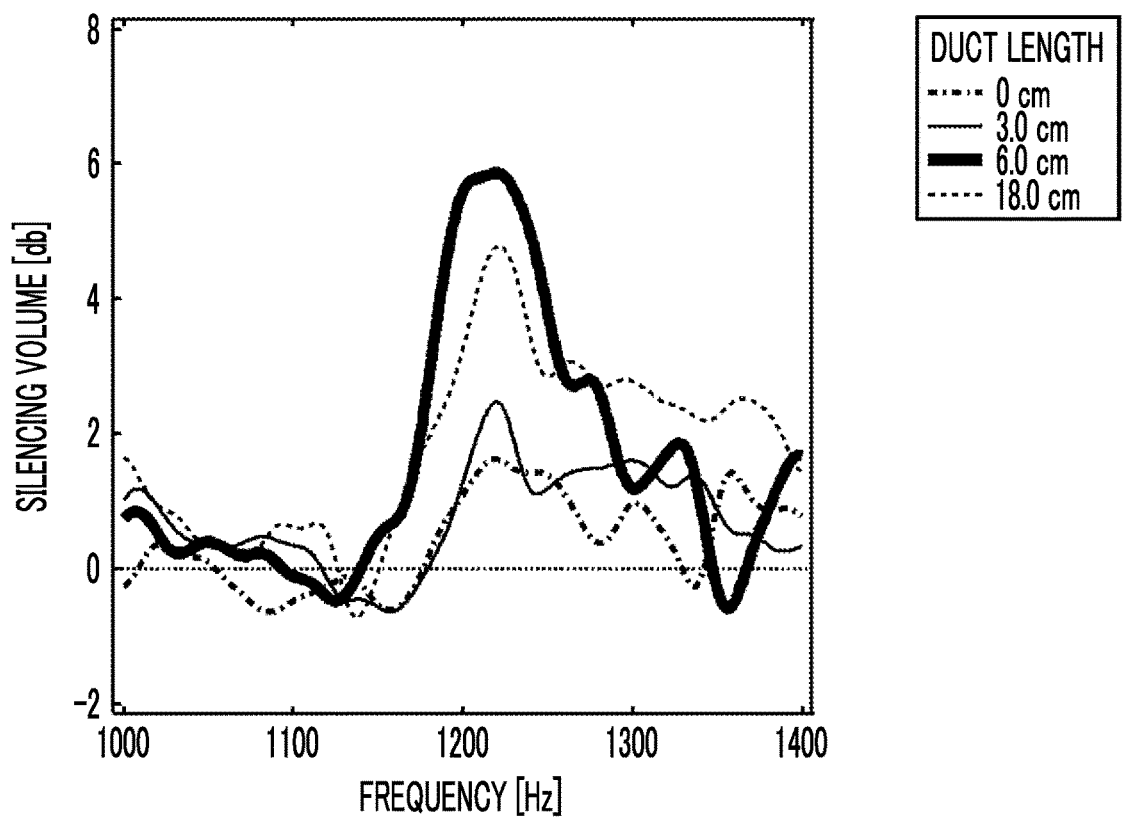

FIG. 33 is a graph showing a relationship between the frequency and the silencing volume.

Figure 34:
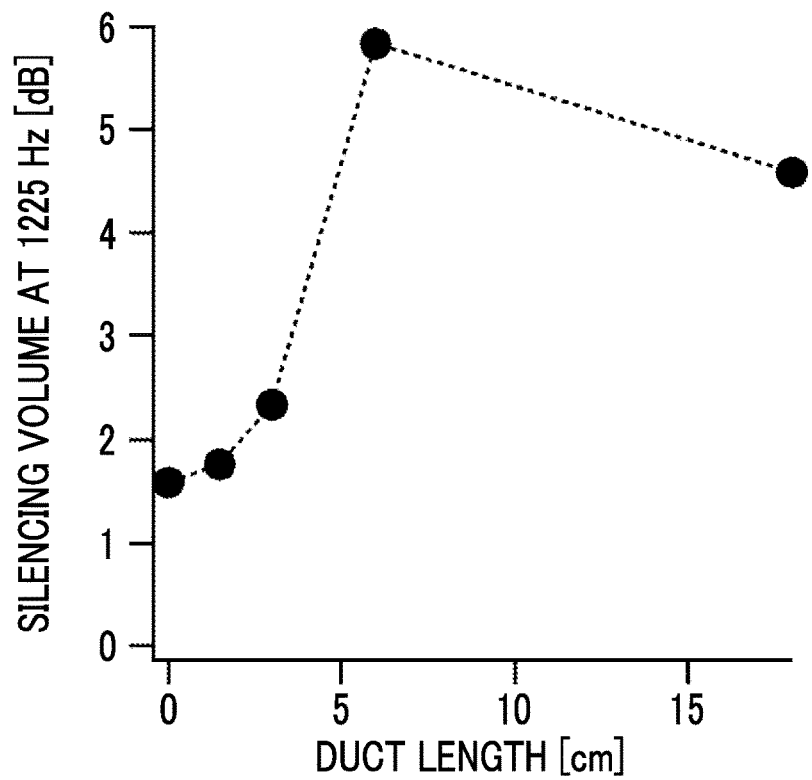

FIG. 34 is a graph showing a relationship between a duct length and the silencing volume at 1225 Hz.

Figure 35:
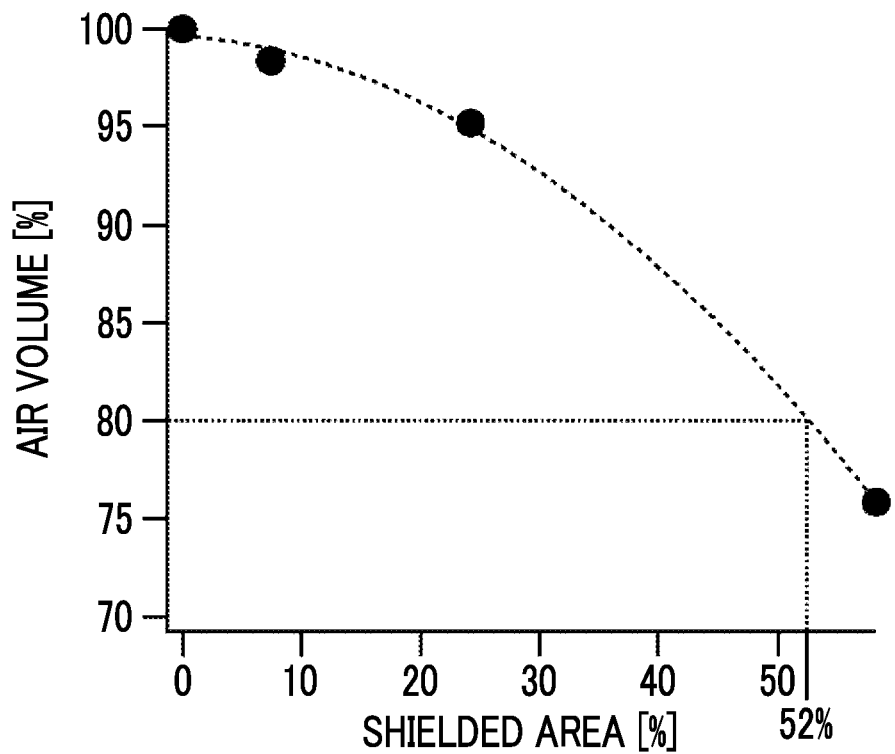

FIG. 35 is a graph showing a relationship between a shielded area and an air volume.

Figure 36:
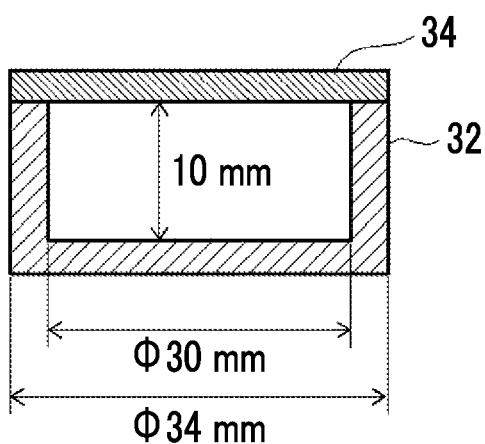

FIG. 36 is a view for describing a configuration of a resonator used in Examples.

Figure 37:
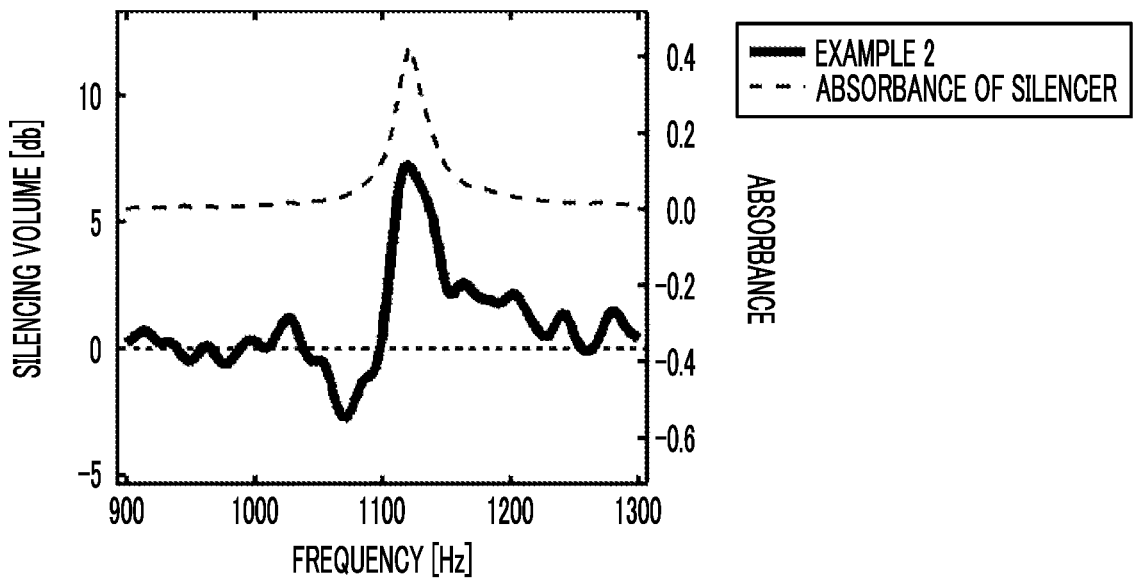

FIG. 37 is a graph showing a relationship between the frequency and the silencing volume and a relationship between the frequency and the absorbance.

Figure 38:
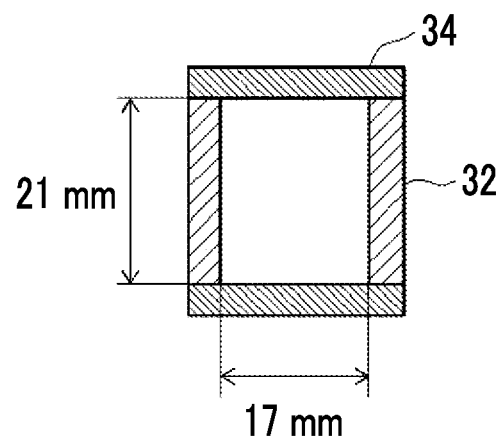

FIG. 38 is a view for describing the configuration of the resonator used in Examples.

Figure 39:
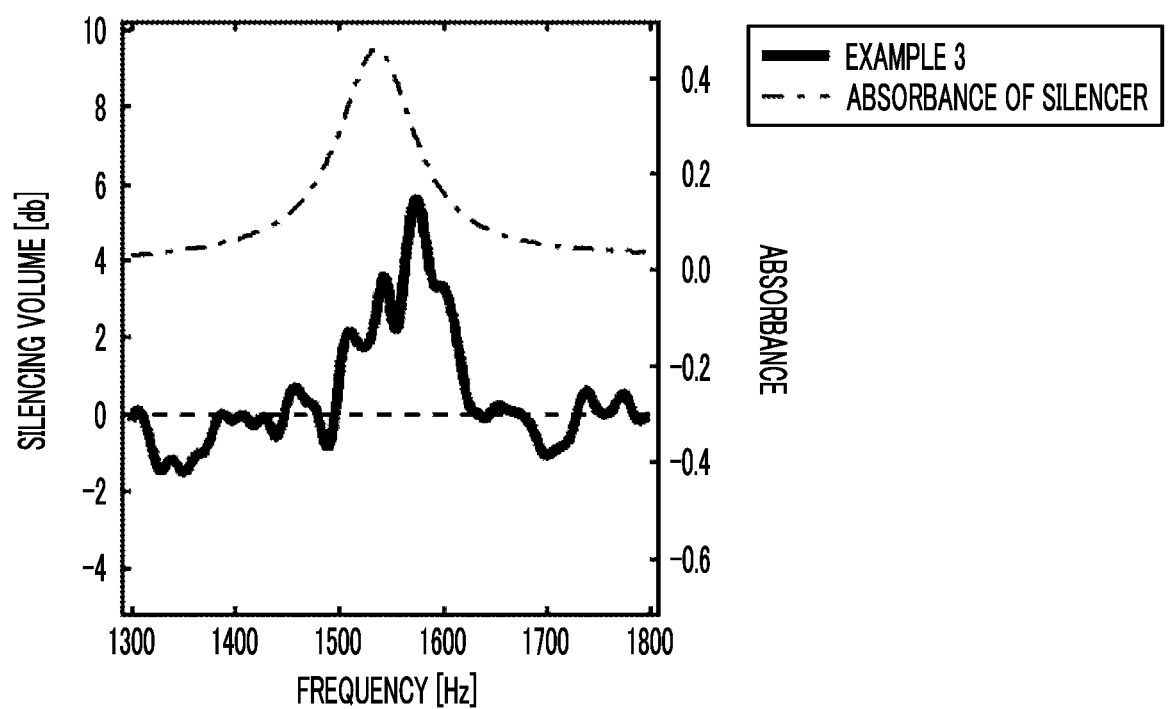

FIG. 39 is a graph showing a relationship between the frequency and the silencing volume and a relationship between the frequency and the absorbance.

DESCRIPTION OF THE PREFERRED EMBODIMENTS

The present invention will be described below in detail.

The description of configuration elements described below is based on a representative embodiment of the present invention, but the present invention is not limited to such an embodiment.

Note that in the present specification, the numerical range represented by "to" means a range including numerical values denoted before and after "to" as a lower limit value and an upper limit value.

In addition, in the present specification, "orthogonal", "parallel", and "perpendicular" include a range of errors accepted in the technical field to which the present invention belongs. For example, "orthogonal" means that it is within a range of less than ±5° with respect to exact orthogonality, and an error with respect to the exact orthogonality is preferably 3° or less. In addition, as for an angle, "orthogonal" means that it is within a range of less than ±5° with respect to an exact angle.

In the present specification, "the same" includes an error range generally accepted in the technical field. In addition, in the present specification, in a case in which the term "entirely" and the like are used, the terms includes, in addition to a case of 100%, the error range generally accepted in the technical field, for example, a case of 99% or more, 95% or more, or 90% or more.

[Blower with Silencer]

A blower with a silencer according to an embodiment of the present invention is a blower with a silencer including an axial fan including a casing, a motor attached to the casing, and a rotor having a shaft portion attached to the motor and rotated and a blade formed to protrude to an outer side of the shaft portion in a radial direction, and a silencer attached to the casing, in which the silencer includes a resonator that selectively silences a dominant sound generated by the axial fan, the silencer is disposed at a position in which at least a part of the silencer overlaps with the shaft portion, as viewed from a rotation axis direction of the rotor, and in a case in which, in a cross section perpendicular to a rotation axis of the rotor, a circle around the rotation axis, which has a radius of a line connecting the rotation axis and a point of a most distal end of the blade, is defined as a rotation region, an area of the silencer in the cross section perpendicular to the rotation axis is smaller than an area of the rotation region.

A configuration of the blower with the silencer according to the embodiment of the present invention will be described with reference to drawings.

FIG. 1 is a perspective view schematically showing an example of the blower with the silencer according to a preferred embodiment of the present invention. FIG. 2 is a front view of FIG. 1 as viewed from an A direction. FIG. 3 is a cross-sectional view taken along a line B-B of FIG. 2.

A blower 10 with a silencer shown in FIGS. 1 to 3 includes an axial fan 12 having a casing 16, a motor 14, and a rotor 18, and a silencer 28.

The axial fan 12 is basically a known axial fan, and rotates a rotor having a plurality of blades to impart kinetic energy to a gas to blow the gas in an axial direction.

Specifically, the axial fan 12 includes the casing 16, the motor 14 attached to the casing 16, and the rotor 18 comprising a shaft portion 20 attached to the motor 14 and rotated, and a blade 22 formed to protrude to an outer side of the shaft portion 20 in a radial direction.

Note that in the following description, a rotation axis of the shaft portion 20 (rotor 18) is simply referred to as the "rotation axis", and the radial direction from the shaft portion 20 (rotor 18) is simply referred to as the "radial direction".

The motor 14 is a general electric motor which rotates the rotor 18.

The shaft portion 20 of the rotor 18 has a substantially columnar shape, and one bottom surface side thereof is attached to a rotation shaft of the motor 14, and the rotor 18 is rotated by the motor 14.

The blade 22 is formed on a peripheral surface of the shaft portion 20 to protrude an outer side of the peripheral surface in the radial direction. In addition, the rotor 18 has a plurality of the blades 22, and the plurality of blades 22 are arranged in a circumferential direction of the peripheral surface of the shaft portion 20. In examples shown in FIGS. 1 to 3, the rotor 18 has a configuration having four blades 22, but the present invention is not limited thereto, and the rotor 18 need only have the plurality of blades 22.

In addition, a shape of the blade 22 can be a shape used in a known axial fan in the related art.

In addition, a thickness of the blade 22 and a thickness of the shaft portion 20 in the rotation axis direction are substantially the same.

The thickness of the blade 22 in the rotation axis direction is about 5 mm to 200 mm. In addition, the thickness of the shaft portion 20 is about 5 mm to 200 mm.

In addition, a diameter of the shaft portion 20 is about 10 mm to 1500 mm. In addition, an outer diameter of the rotor 18, that is, an outer diameter of the blade 22 passing through the most distal end side in the radial direction is about 20 mm to 2000 mm.

The rotor 18 having the blade 22 is rotated by the motor 14 to generate an air flow (wind) in the rotation axis direction. A flow direction of the air flow is not limited, and may flow, in the rotation axis direction, from the motor 14 side to a direction opposite to the motor 14, or may flow from a side opposite to the motor 14 to the motor 14 side.

In addition, the casing 16 fixes the motor 14, and surrounds the rotor 18 (blade 22) that can be rotated in the radial direction.

The thickness of the casing 16 in the rotation axis direction is thicker than the thicknesses of the blade 22 and the shaft portion 20 such that the rotor 18 can be protected from the outside.

The casing 16 includes a support portion 16a that supports the motor 14 on one surface side in the rotation axis direction, a wind tunnel portion 16b that surrounds the rotor 18 from the outer side in the radial direction, a cover portion 16c that covers a region of the shaft portion 20 on the other surface side in the rotation axis direction, and a connecting portion 16d that protrudes from the support portion 16a and the cover portion 16c toward the outer side in the radial direction, and connects the support portion 16a, the cover portion 16c, and the wind tunnel portion 16b.

A diameter of the support portion 16a need only be a size that can support the motor 14 and does not inhibit a flow of the air flow generated by the rotation of the rotor 18. For example, the diameter of the support portion 16a is substantially the same as the diameter of the shaft portion 20.

Similarly, a diameter of the cover portion 16c need only be a size that can protect the shaft portion 20 from the outside and does not inhibit a flow of the air flow generated by the rotation of the rotor 18. For example, the diameter of the cover portion 16c is substantially the same as the diameter of the shaft portion 20.

A width, the number, and the like of the connecting portion 16d need only be a size, the number, and the like that can reliably fix the support portion 16a and the wind tunnel portion 16b, and the cover portion 16c and the wind tunnel portion 16b, respectively, and does not inhibit a flow of the air flow generated by the rotation of the rotor 18.

A thickness of the casing 16 need only be a thickness that can protect the rotor 18 from the outside, suppress the air flow in the radial direction among the air flows generated by the rotation of the rotor 18, and increase the air volume in the rotation axis direction, that is, need only be a thickness about 1.01 times to 3.00 times the thickness of the blade 22 and/or the shaft portion 20.

Further, the axial fan 12 may have various configurations of a known axial fan.

For example, in the examples shown in FIGS. 1 to 3, the axial fan 12 has a hole 16e into which a fastening member such as a screw is inserted in a case in which the axial fan 12 is fixed to various devices.

The silencer 28 includes the resonator and is attached to the casing 16.

The resonator selectively silences a dominant sound generated by the axial fan 12.

As described above, the axial fan 12 rotates the rotor having the plurality of blades to impart the kinetic energy to the gas and blow the gas in the axial direction. Therefore, the axial fan 12 generates a sound of which a sound pressure is a maximum value at a specific frequency, which is determined by the rotation speed and the number of blades. In the present invention, the dominant sound refers to a sound of which the sound pressure reaches a maximum value at this specific frequency.

Specifically, the dominant sound is a sound having a tone-to-noise ratio (TNR) defined by the European standard ECMA-74 as a prominent discrete tone or a prominence ratio (PR) of 3 dB or more.

The resonator has a resonance frequency, which is substantially the same as the frequency of the dominant sound, and uses a resonance phenomenon to silence the sound (dominant sound) of that frequency.

Note that in a case in which the axial fan 12 generates a plurality of the dominant sounds, the silencer 28 need only silence at least one dominant sound, but a configuration having a plurality of resonators that silence the plurality of dominant sounds, respectively, is preferable.

In the examples shown in FIGS. 1 to 3, the silencer 28 is configured by one film type resonator 30.

A film type resonator 30 has a frame 32 and a film 34, and resonates due to the film vibration of the film 34 supported by the frame 32 to allow vibration.

In the examples shown in FIGS. 1 to 3, the frame 32 has a columnar shape and an opening portion having a bottom surface formed on one surface. That is, the frame 32 has a bottomed cylindrical shape with one surface open.

The film 34 is a film-like member, and covers an opening surface of the frame 32 on which the opening portion is formed, and a peripheral portion thereof is fixed to the frame 32 and is supported to allow vibration thereof.

In addition, a back space surrounded by the frame 32 and the film 34 is formed on a back side (frame 32 side) of the film 34. In the examples shown in FIGS. 1 to 3, the back space is a closed space, which is closed.

The film type resonator 30 having such a configuration uses the resonance phenomenon to express at least one of functions of sound absorption or reflection with respect to the dominant sound generated by the axial fan 12, and selectively silences the dominant sound.

In the film type resonator 30 using the film vibration, the resonance frequency of the film vibration need only be appropriately set to silence the dominant sound generated by the axial fan 12. The resonance frequency of the film vibration is determined by the size (size of the vibration surface, that is, a size of the opening portion of the frame 32), the thickness, the hardness, and the like of the film 34. Therefore, the frequency of the resonating sound can be appropriately set by adjusting the size, the thickness, the hardness, and the like of the film 34.

Note that the resonance frequency of the resonator is not limited as long as the dominant sound can be significantly silenced, but the resonance frequency is preferably within a range of ±15% of the frequency of the dominant sound, and more preferably within a range of ±10%, and still more preferably a range of ±5%.

In addition, a sound absorbance at the frequency of the dominant sound is preferably in a range of 0.15 or more, more preferably in a range of 0.2 or more, and still more preferably in a range of 0.25 or more.

In addition, as described above, the film type resonator 30 has the back space on the back side of the film 34. Since the back space is closed, sound absorption occurs due to the interaction between the film vibration and the back space.

Specifically, the film vibration has a frequency band of a fundamental vibration mode and a higher order vibration mode determined by the conditions of the film (thickness, hardness, size, fixing method, and the like), and a determination is made as to which mode of frequency is strongly excited to contribute to sound absorption, by the thickness of the back space and the like. In a case in which the thickness of the back space is thin, the effect is obtained in which the back space is qualitatively hardened, so that it is easy to excite the higher order vibration mode of the film vibration.

The thickness of the film 34 is preferably less than 100 μm, more preferably 70 μm or less, and still more preferably 50 μm or less. Note that in a case in which the thickness of the film 34 is not uniform, an average value thereof need only be in the above range.

On the other hand, in a case in which the thickness of the film is too thin, it is difficult to be treated. A film thickness is preferably 1 μm or more, and more preferably 5 μm or more.

A Young's modulus of the film 34 is preferably 1000 Pa to 1000 GPa, more preferably 10000 Pa to 500 GPa, and most preferably 1 MPa to 300 GPa.

A density of the film 34 is preferably 10 kg/m$^3$ to 30000 kg/m$^3$, more preferably 100 kg/m$^3$ to 20000 kg/m$^3$, and most preferably 500 kg/m$^3$ to 10000 kg/m$^3$.

In addition, a thickness of the back space is preferably 10 mm or less, more preferably 5 mm or less, and still more preferably 3 mm or less.

Note that in a case in which the thickness of the back space is not uniform, an average value thereof need only be in the above range.

Here, in the present invention, a configuration is adopted in which the silencer is disposed at a position in which at least a part of the silencer overlaps with the shaft portion, as viewed from a rotation axis direction of the rotor, and in a case in which, in a cross section perpendicular to the rotation axis, a circle around the rotation axis, which has a radius of a line connecting the rotation axis and a point (point Q in FIG. 2) of the outermost distal end of the blade in the radial direction, is defined as a rotation region, an area of the silencer in the cross section perpendicular to the rotation axis is smaller than an area of the rotation region. The rotation region can also be referred to as a region in which the rotor is rotated as viewed from the rotation axis direction.

Specifically, in the examples shown in FIGS. 1 to 3, the film type resonator 30 is attached to the cover portion 16c of the casing 16. As described above, since the cover portion 16c is formed to cover the shaft portion 20, as viewed from the rotation axis direction, the film type resonator 30 attached to the cover portion 16c is disposed at a position in which at least a part of the film type resonator 30 overlaps with the shaft portion, as viewed from the rotation axis direction.

In addition, in the examples shown in FIGS. 1 to 3, an outer diameter of the film type resonator 30 in the cross section perpendicular to the rotation axis is smaller than an outer diameter of the shaft portion 20. That is, an area of the film type resonator 30 in the cross section perpendicular to the rotation axis is smaller than an area of the shaft portion 20.

In addition, in the examples shown in FIGS. 1 to 3, a central axis of the film type resonator 30 is disposed to coincide with the rotation axis. Therefore, the film type resonator 30 is disposed to overlap with the shaft portion 20 as a whole, as viewed from the rotation axis direction.

As described above, in a case in which the porous sound absorbing material is used in order to silence the dominant sound generated by the axial fan, it is necessary to increase the volume in order to obtain a sufficient sound silencing effect, but since it is necessary to ensure the air volume by the axial fan, there is a problem in which a size of the porous sound absorbing material is limited, and thus it is difficult to achieve both high ventilation property (air volume) and soundproofing performance.

In addition, it has also been proposed to use a resonance type silencer in order to silence the dominant sound, but in a case in which the silencer is installed in the passage of the wind generated by the axial fan, there is a problem in which the silencer inhibits the ventilation, and thus the air volume is reduced. On the other hand, in a case in which the silencer is installed on an outer peripheral portion of the passage of the wind generated by the axial fan in order to ensure the ventilation property (that is, air volume), since a space for installing the silencer is required, there is a problem in which the entire device is increased in size.

The blower with the silencer according to the embodiment of the present invention can selectively silence the dominant sound generated by the axial fan by the silencer including the resonator. In addition, by a configuration in which the silencer is attached to the casing at a position in which at least a part of the silencer overlaps with the shaft portion, as viewed from the rotation axis direction and the area of the silencer in the cross section perpendicular to the rotation axis is smaller than the area of the rotation region, an inhibition of a flow of the air flow (wind) generated by the axial fan can be suppressed and the air volume can be ensured, and since the silencer is installed in a flow passage of wind generated by the axial fan, an increase in the size of the entire device in which the fan and the silencer are installed can be suppressed.

Here, as in the examples shown in FIGS. 1 to 3, in a case of a configuration in which the area of the film type resonator 30 (silencer) in the cross section perpendicular to the rotation axis is smaller than the area of the shaft portion 20 and the film type resonator 30 (silencer) is disposed to overlap with the shaft portion 20 as a whole, as viewed from the rotation axis direction, the area of the silencer is preferably 70% or more of the area of the shaft portion 20, more preferably 80% or more, and still more preferably 85% or more.

By increasing the area of the silencer and reducing a margin space that does not contribute to the air volume, a space in which sound waves are present can be reduced, and by increasing the size of the silencer, an interaction between the silencer and the sound waves is increased, and thus the silencing efficiency can be improved.

In addition, in the examples shown in FIGS. 1 to 3, the configuration is adopted in which the area of the film type resonator 30 (silencer) in the cross section perpendicular to the rotation axis is smaller than the area of the shaft portion 20 and the film type resonator 30 (silencer) is disposed to overlap with the shaft portion 20 as a whole, as viewed from the rotation axis direction, the present invention is not limited thereto as long as it is a configuration in which the area of the silencer is smaller than the area of the rotation region and the silencer is disposed at a position in which at least a part of the silencer overlaps with the shaft portion 20.

For example, as in an example shown in FIG. 4, the area of the film type resonator 30 (silencer) in the cross section perpendicular to the rotation axis may be larger than the area of the shaft portion 20.

Alternatively, the silencer may be disposed at a position in which the central axis thereof deviates from the rotation axis.

Note that from the viewpoint of the air volume, it is preferable to adopt a configuration in which the area of the silencer is smaller than the area of the shaft portion and the silencer is disposed to overlap with the shaft portion as a w % bole, as viewed from the rotation axis direction.

In a case of a configuration in which the area of the silencer is larger than the area of the shaft portion 20 or a configuration in which the central axis of the silencer deviates from the rotation axis, the silencer overlaps with a blade region as viewed from the rotation axis direction. The blade region is a region in which the blade are present, excluding the region of the shaft portion from the rotation region described above as viewed from the rotation axis direction.

As described above, in a case of the configuration in which the silencer and the blade region overlap with each other, the area of the overlapping region is preferably 52% or less of the area of the blade region, more preferably 35% or less, and still more preferably 25% or less.

By setting a ratio of the area of the region in which the silencer and the blade region overlap with each other to the above range, it is possible to suppress inhibition of a flow of the air flow (wind) generated by the axial fan and to ensure the air volume more suitably.

In addition, a thickness $H_2$ (see FIG. 3) of the silencer in an axial direction is preferably within three times of a thickness $H_1$ of the axial fan 12, more preferably within twice, and still more preferably within 1.8 times.

By setting the thickness $H_2$ of the silencer within the above range, the inhibition of a flow of the air flow (wind) generated by the axial fan can be suppressed, the air volume can be more suitably ensured, and the blower with the silencer can be reduced in size.

Note that the thickness $H_1$ of the axial fans and the thickness $H_2$ of the silencer are the maximum thicknesses in the rotation axis direction, respectively.

In addition, in the examples shown in FIGS. 1 to 3, the shape of the film type resonator 30 as viewed from the direction perpendicular to the surface of the film 34, that is the shape of a vibration region of the film 34 is a circular shape, but the present invention is not limited thereto, and as shown in FIG. 10, the shape thereof may be a quadrangular shape, a polygonal shape such as a triangular shape, an elliptical shape, or the like.

In the examples shown in FIGS. 1 to 3, a configuration is adopted in which the silencer 28 is attached to the cover portion 16c of the axial fan 12, but the present invention is not limited thereto, and a configuration may be adopted in which the silencer 28 is attached to the support portion 16a of the axial fan 12. That is, the silencer 28 may be disposed on an upstream side of the wind generated by the axial fan 12 or may be disposed on a downstream side thereof.

In addition, in the examples shown in FIGS. 1 to 3, a configuration is adopted in which the silencer includes one resonator, but the present invention is not limited thereto, and a configuration may be adopted in which a plurality of resonators are provided.

For example, as in an example shown in FIG. 5, a configuration may be adopted in which two film type resonators 30 are provided. In the example shown in FIG. 5, the two film type resonators 30 are installed to face each other on the back side. That is, the two film type resonators 30 are disposed such that the surface of the film 34 faces the radial direction. In addition, in the example shown in FIG. 5, the frames 32 of the two film type resonators 30 are integrally formed. As described above, the silencing performance can be further improved by the configuration in which a plurality of resonators are provided.

Note that in a case in which the configuration is adopted in which a plurality of resonators are provided, a configuration may be further adopted in which the back spaces are integrated. That is, for example, a configuration may be adopted in which two film type resonators are constituted by disposing a film on each of the two opening surfaces of the frame having penetrating opening portions.

In addition, in a case of the configuration in which a plurality of resonators are provided, a configuration may be adopted in which at least any two of the plurality of resonators have the resonance frequencies different from each other.

For example, in the example shown in FIG. 5, a configuration may be adopted in which two film type resonators 30 have different material of the film 34, thickness, size of the vibration region, thickness of the back space, and the like, and have different resonance frequencies from each other.

As described above, by adopting the configuration in which the resonators having different resonance frequencies are provided, a configuration can be adopted in which each resonator selectively silences any of a plurality of the dominant sounds generated by the axial fan 12, and thus the sound can be suitably silenced even in a case in which the axial fan 12 generates the plurality of dominant sounds.

Here, in the film type resonator 30, a direction perpendicular to the surface of the film 34 and opposite side to the frame 32 is defined as a vibration direction S of a vibrating body, the vibration direction S of the vibrating body may face any direction, but an angle to the rotation axis is 0° in a case of an outward direction (direction opposite to the axial fan 12) of the rotation axis direction, and is 180° in a case of an inward direction (direction on the axial fan 12 side) of the rotation axis direction, the direction S of the vibrating body of the resonator is preferably 0° or more and 900 or less, more preferably 0° or more and 45° or less, and still more preferably 0° or more and 30° or less.

For example, the example shown in FIG. 3 described above is a case in which the vibration direction S of the vibrating body is 0°. In addition, the example shown in FIG. 5 is a case in which the vibration directions S of the vibrating bodies are 90°, respectively.

In addition, an example shown in FIG. 6 is a case in which the vibration direction S of the vibrating body is 45°.

In FIG. 6, a frame 32b in which two frames having a triangular prism shape with one side surface open are disposed such that side surfaces thereof are on the same plane and the other side surfaces thereof are integrated, and two films 34 disposed in two opening portions of the frames 32b, respectively, are provided. As shown in FIG. 6, the vibration direction S of the vibrating body of each film 34 is 45°.

In addition, an example shown in FIG. 7 is a case in which the vibration direction S of the vibrating body is 180°.

In FIG. 7, the film type resonator 30 includes the frame 32, the film 34, a connection frame 36 extending from the side surface of the frame 32 in the direction perpendicular to the surface of the film 34, and a seat 38 to which the connection frame 36 is fixed, and the seat 38 is installed in the casing 16 (cover portion 16c) of the axial fan 12. Therefore, the vibration direction S of the vibrating body of the film type resonator 30 in FIG. 7 is 180°.

As can be seen from FIG. 7, in a case in which the vibration direction S of the vibrating body is larger than 90°, a space of which the cross section area is expanded and then is reduced in the traveling direction of the wind in the rotation axis direction is formed. In a case in which the wind passes through this space, the resistance is increased, and thus a wind noise is likely to be generated. In addition, in a case in which the resonator is a Helmholtz resonator or an air column resonator, which will be described below, in a case in which the vibration direction S of the vibrating body is larger than 90°, the wind easily hits the opening portion directly, and thus a wind noise is likely to be generated.

In addition, in a case in which the vibration direction S of the vibrating body is larger than 90° the wind generated by the axial fan directly hits the film 34. Therefore, the tension is applied to the film 34, and the resonance frequency of the film type resonator deviates from a desired resonance frequency, which may reduce the silencing effect.

From the above points, the direction S of the vibration surface is preferably 0° or more and 90° or less.

In addition, in a case in which the configuration is adopted in which a plurality of resonators are provided, a configuration may be adopted in which two or more resonators having different vibration directions S of the vibrating bodies are provided.

For example, in an example shown in FIG. 8, a frame 32c that has a quadrangular pillar shape and has three adjacent surfaces open, and three films 34 disposed on three opening surfaces of the frame 32c, respectively, are provided. That is, the three films 34 and the three frame 32c constitute three film type resonators having a common back space. The vibration directions S of the vibrating bodies of the film type resonator formed by the films 34 are 90°, 0°, and 90°, respectively.

In addition, in an example shown in FIG. 9, a configuration is adopted in which the film type resonator 30 is further installed on the back side of the film type resonator 30 shown in FIG. 7. In FIG. 9, the vibration directions S of the vibrating bodies of the two film type resonators 30 are 180° and 0°, respectively.

Hereinafter, other examples of the configuration and the installation form of the film type resonator 30 in a case in which the direction S of the vibration surface is 90° will be described with reference to FIGS. 11 to 14.

An example shown in FIG. 11 is an example in which one film type resonator 30 is installed on the cover portion 16c of the casing 16 such that the vibration direction S of the vibrating body is 90°. As shown in FIG. 11, the film 34 (direction S of the vibration surface) nee only face any of the radial directions.

An example shown in FIG. 12 is an example in which four film type resonators 30 are installed on the cover portion 16c of the casing 16. Each film type resonator 30 is installed such that the vibration direction S of the vibrating body is 90°. In addition, the vibration directions S of the vibrating bodies of the film type resonators 30 are installed at intervals of 90° in the radial direction.

In an example shown in FIG. 13, a frame 32d having a quadrangular pillar shape and having opening portions formed in four surfaces other than two facing surfaces and four films 34 disposed on four opening surfaces of the frame 32d, respectively are provided to constitute four film type resonators. In FIG. 13, the four film type resonators share the back space.

One surface of the frame 32d in which the opening portion is not formed is installed on the cover portion 16c of the casing 16, and all of the vibration directions S of the vibrating bodies by the four films 34 are 90°. In addition, in the radial direction, the vibration directions S of the vibrating bodies face different directions.

In an example shown in FIG. 14, the example shown in FIG. 13 has a configuration in which a portion that divides the back space is provided. That is, in FIG. 14, in the four film type resonators, frames 32e are integrated, but the back spaces are independent of each other.

Also in this configuration, all of the vibration directions S of the vibrating bodies of the four film type resonators are 90°. In addition, in the radial direction, the vibration directions S of the vibrating bodies face different directions.

Note that a method of attaching the silencer (resonator) to the casing of the axial fan is not particularly limited, and a known fixing method such as a method using an adhesive, a pressure sensitive adhesive, a double-sided tape, and a mechanical method such as screwing can be used as appropriate.

In addition, in the examples shown in FIGS. 1 to 3, a configuration is adopted in which the silencer 28 includes only the film type resonator 30, but the present invention is not limited thereto, and a configuration may be adopted in which the silencer 28 further includes the porous sound absorbing material.

For example, in an example shown in FIG. 15, the silencer 28 includes a porous sound absorbing material 48 in the space surrounded by the frame 32 and the film 34 of the film type resonator 30, that is, in the back space.

In addition, in an example shown in FIG. 16, the silencer 28 includes the porous sound absorbing material 48 on an upper surface of the film 34 of the film type resonator 30.

By adopting a configuration in which the silencer 28 includes the porous sound absorbing material 48, it is possible to silence the sound having a frequency other than the dominant sound selectively silenced by the resonator, in a wide band.

The porous sound absorbing material 48 is not particularly limited, and a well-known porous sound absorbing material can be appropriately used. For example, various well-known porous sound absorbing material can be used such as foam materials and materials containing minute air such as urethane foam, soft urethane foam, wood, ceramic particle sintered material, phenol foam, and the like; fibers and fabric materials such as glass wool, rock wool, microfibers (Thinsulate manufactured by 3M), a floor mat, a carpet, a meltblown nonwoven fabric, a metal nonwoven fabric, a polyester nonwoven fabric, metal wool, felt, an insulation board and a glass nonwoven fabric, and wood wool cement board, nanofiber materials such as silica nanofiber, gypsum board, and the like.

A flow resistance of the porous sound absorbing material is not particularly limited, but is preferably 1000 to 100000 (Pa·s/m$^2$), more preferably 3000 to 80000 (Pa·s/m$^2$), and still more preferably 5000 to 50000 (Pa·s/m$^2$).

The flow resistance of the porous sound absorbing material can be evaluated by measuring a perpendicular incident sound absorbance of the porous sound absorbing material having a thickness of 1 cm and fitting by the Miki model (J. Acoust. Soc. Jpn., 11(1), pp. 19 to 24 (1990)). Alternatively, an evaluation may be made according to "ISO 9053".

In addition, a plurality of the porous sound absorbing materials having different flow resistances may be laminated.

Note that as in the example shown in FIG. 16, in a case in which the silencer 28 has a configuration in which the film type resonator 30 and the porous sound absorbing material 48 are laminated, the thickness $H_2$ of the silencer 28 is a total thickness of the film type resonator 30 and the porous sound absorbing material 48.

In addition, in the examples shown in FIGS. 1 and 3, the back space of the film type resonator 30 is a closed space completely surrounded by the frame 32 and the film 34, but is not limited thereto, and the space need only be substantially divided such that the air flow is inhibited, and an opening may be provided in a part of the film 34 or the frame 32 in addition to the completely closed space. Such a form providing the opening in a part thereof is preferable from the point that a change in the sound absorption characteristic as a gas in the back space is expanded or contracted due to a temperature change, tension is applied to the film 34, and the hardness of the film 34 is changed can be prevented.

By forming a through-hole in the film 34, propagation by air propagation sound occurs. Due to the above, the acoustic impedance of the film 34 is changed. In addition, the weight of the film 34 is reduced due to the through-hole. Due to the above, the resonance frequency of the film type resonator 30 can be controlled.

A position in which the through-hole is formed is not particularly limited.

Here, in the examples shown in FIGS. 1 to 3, a configuration is adopted in which the silencer 28 includes the film type resonator 30 as a resonator, but the present invention is not limited thereto. The silencer 28 may have the Helmholtz resonator and/or the air column resonator as a resonator.

FIG. 17 is a front view schematically showing an example of the blower 10 with the silencer having a configuration in which the silencer 28 includes a Helmholtz resonator 40. FIG. 18 is a cross-sectional view taken along a line B-B of FIG. 17.

In the examples shown in FIGS. 17 and 18, the resonator is the Helmholtz resonator 40. The Helmholtz resonator 40 includes a frame 42 having a columnar shape and an opening portion having a bottom surface formed on one surface, a plate-shaped lid portion 44 having a through-hole 46, which covers the opening surface of the frame 42 on which the opening portion is formed to fix a peripheral portion to the frame 42. The Helmholtz resonator 40 has a structure in which the air in an inner space surrounded by the frame 42 and the lid portion 44 serves as a spring, the air in the through-hole 46 formed in the lid portion 44 serves as a weight (mass), the mass and spring are resonated, and the sound is absorbed by thermal viscous friction near the wall of the through-hole 46.

As is well known, by matching a resonance frequency of the Helmholtz resonator to the frequency of the sound (dominant sound) to be silenced, the Helmholtz resonator can silence the sound of that frequency.

In a case in which the Helmholtz resonator 40 is used as the resonator, the resonance frequency of the Helmholtz resonance need only be appropriately set to silence the dominant sound generated from the axial fan 12. The resonance frequency of Helmholtz resonance is determined by a volume of the inner space surrounded by the frame 42 and the lid portion 44, an area and a length of the through-hole 46, and the like. Therefore, the frequency of the resonating sound can be appropriately set by adjusting the volume of the inner space surrounded by the frame 42 and the lid portion 44 of the Helmholtz resonator 40, the area of the through-hole 46, the length, and the like.

Here, in the examples shown in FIGS. 17 and 18, a configuration is adopted in which the through-hole 46 is formed in the lid portion 44, but the present invention is not limited thereto, and the through-hole 46 may be formed in the frame 42.

In addition, in the examples shown in FIGS. 17 and 18, a configuration is adopted in which the Helmholtz resonator 40 is provided separately from the frame 42 and the lid portion 44, but the frame 42 and the lid portion 44 may be integrally formed.

In the Helmholtz resonator 40, the air in the Helmholtz resonator 40 is the vibrating body, and the vibration direction of the air is the vibration direction S of the vibrating body. Although the direction depends on the shape of the Helmholtz resonator 40, basically, a direction, which is a penetration direction of the through-hole 46 and opposite to the frame 42, is the vibration direction S of the vibrating body. The vibration direction S of the vibrating body in a case of the Helmholtz resonator can be obtained by numerical calculation.

Even in a case in which the Helmholtz resonator 40 is used, the vibration direction S of the vibrating body of the Helmholtz resonator 40 may be any direction, but is preferably 0° or more and 900 or less, more preferably 0° or more and 45° or less, and still more preferably 0° or more and 30° or less.

In the examples shown in FIGS. 17 and 18, the vibration direction S of the vibrating body of the Helmholtz resonator 40 is 0°.

In addition, in the examples shown in FIGS. 17 to 18, the shape of the Helmholtz resonator 40 as viewed from the direction perpendicular to the surface of the lid portion 44 is a circular shape, but the present invention is not limited thereto, and as shown in FIG. 19, the shape thereof may be a quadrangular shape, a polygonal shape such as a triangular shape, an elliptical shape, and the like.

In the examples shown in FIGS. 17 and 18, a configuration is adopted in which the silencer 28 includes one Helmholtz resonator 40, but the present invention is not limited thereto, and a configuration may be adopted in which a plurality of Helmholtz resonators is provided. In the case of a configuration in which a plurality of Helmholtz resonators are provided, the frames of the Helmholtz resonators may be integrally formed, or the inner space may be shared.

In addition, in a case of the configuration in which a plurality of Helmholtz resonators are provided, a configuration may be adopted in which two or more Helmholtz resonators having different vibration directions S of the vibrating bodies are provided.

Hereinafter, examples of various forms in a case in which the silencer includes the Helmholtz resonator will be described with reference to FIGS. 20 to 25.

An example shown in FIG. 20 has the same configuration as the examples shown in FIGS. 17 and 18 except that three through-holes 46 are formed in the lid portion 44 of the Helmholtz resonator. The through-holes 46 constitute the Helmholtz resonator together with a common inner space. That is, the example shown in FIG. 20 is an example in which three Helmholtz resonators are provided and the three Helmholtz resonators share the inner space.

In an example shown in FIG. 21, the Helmholtz resonator has the same configuration as the example shown in FIG. 20 except that the Helmholtz resonator includes a portion that divides the inner space into three parts. In the example shown in FIG. 21, the inner space is formed for each through-hole 46. That is, the example shown in FIG. 21 is an example in which three Helmholtz resonators are provided and the frames of the three Helmholtz resonators are integrated.

An example shown in FIG. 22 is an example in which a frame 42, which has a pentagonal prism shape and has five triangular prism opening portions on one bottom surface, and the lid portion 44 having five through-holes 46 formed at each position of five opening portions are provided to constitute five Helmholtz resonators. In the example shown in FIG. 22, a configuration can be adopted in which five Helmholtz resonators having a triangular shape as viewed from the direction perpendicular to the surface of the lid portion 44 are arranged to form a pentagonal shape and the frames thereof are integrated. Therefore, the shape of the Helmholtz resonator 40 as viewed from the direction perpendicular to the surface of the lid portion 44 is a pentagonal shape.

An example shown in FIG. 23 has the same configuration as the example shown in FIG. 21 except that the volumes of the inner spaces of the three Helmholtz resonators are configured to be different. That is, the example shown in FIG. 23 is an example in which three Helmholtz resonators having different resonance frequencies are provided.

An example shown in FIG. 24 is an example in which the frame 42 having a quadrangular pillar shape and one opening portion and the lid portion 44 disposed in the opening portion of the frame 42 are provided, and two through-holes 46 are formed in the frame 42 to constitute two Helmholtz resonators. In the example shown in FIG. 24, it can be said that the through-hole 46 is not formed in the lid portion 44, and the through-hole 46 is formed in the frame 42 in the example shown in FIG. 19.

In the example shown in FIG. 24, the vibration direction S of the vibrating body of the Helmholtz resonator 40 is 90°.

An example shown in FIG. 25 is an example in which the frame 42 having a cylindrical bottom surface, a cylindrical outer side surface erected from an outer diameter portion of the cylindrical bottom surface, and a cylindrical inner side surface erected from an inner diameter portion of the cylindrical bottom surface, and the lid portion 44 having the same cylindrical shape with the bottom surface and two through-holes 46 are provided to constitute two Helmholtz resonators. As described above, the Helmholtz resonator may have a hole in a center portion.

In addition, in the present invention, the resonator provided in the silencer may be the air column resonator.

In the air column resonator, the resonance occurs by generating a standing wave in a resonance pipe having an opening.

In a case in which the air column resonator is used as the resonator, the resonance frequency of the air column resonance need only be appropriately set to silence the dominant sound generated from the axial fan 12. The resonance frequency of the air column resonance is determined by a length of the resonance pipe and the like. Therefore, the frequency of the resonating sound can be appropriately set by adjusting the depth of the resonance pipe, the size of the opening, and the like.

Note that in a case in which a configuration is adopted in which the resonator has the inner space and the through-hole (opening portion) which communicates the inner space with the outside, whether a resonance structure causing air column resonance or a resonance structure causing Helmholtz resonance is provided is determined in response to the size and position of the through-hole, the size of the inner space, and the like. Therefore, by adjusting the above appropriately, it is possible to select whether the air column resonance or the Helmholtz resonance is adopted as the resonance structure.

In the case of air column resonance, in a case in which the opening portion is narrow, the sound wave is reflected at the opening portion and it is difficult for the sound wave to enter the inner space, and thus it is preferable that the opening portion be wide to a certain extent. Specifically, in a case in which the opening portion has a rectangular shape, the length of the short side is preferably 1 mm or more, more preferably 3 mm or more, and still more preferably 5 mm or more. In a case in which the opening portion has a circular shape, it is preferable that the diameter be in the range described above.

On the other hand, in the case of Helmholtz resonance, it is necessary to generate thermal viscous friction at the through-hole, and thus it is preferable that the opening portion be narrow to a certain extent. Specifically, in a case in which the through-hole has a rectangular shape, the length of the short side is preferably 0.5 mm or more and 20 mm or less, more preferably 1 mm or more and 15 mm or less, and still more preferably 2 mm or more and 10 mm or less. In a case in which the through-hole has a circular shape, it is preferable that the diameter be in the range described above.

Note that in the blower with the silencer according to embodiment of the present invention, a configuration may be adopted in which the silencer includes a different type of resonator. For example, a configuration may be adopted in which the Helmholtz resonator and the film type resonator are provided.

Examples of materials of the film type resonator and the frames and the lid portions of the Helmholtz resonator and the air column resonator (hereinafter, collectively referred to as a "frame material") include a metal material, a resin material, a reinforced plastic material, a carbon fiber, and the like. Examples of the metal material include metal materials such as aluminum, titanium, magnesium, tungsten, iron, steel, chromium, chromium molybdenum, nichrome molybdenum, copper, alloys thereof, and the like. In addition, examples of the resin material include resin materials such as an acrylic resin, polymethyl methacrylate, polycarbonate, polyamide-imide, polyarylate, polyetherimide, polyacetal, polyether ether ketone, polyphenylene sulfide, polysulfone, polyethylene terephthalate, polybutylene terephthalate, polyimide, an acrylonitrile, butadiene, styrene copolymer synthetic resin (ABS resin), polypropylene, triacetyl cellulose, and the like. In addition, examples of the reinforced plastic material include carbon fiber reinforced plastics (CFRP), and glass fiber reinforced plastics (GFRP). In addition, natural rubber, chloroprene rubber, butyl rubber, ethylene/propylene/diene rubber (EPDM), silicone rubber, and the like, and rubber containing these crosslinked structures are exemplary examples.

In addition, as the frame material, various honeycomb core materials can be used. Since the honeycomb core material is lightweight and used as a highly rigid material, ready-made product thereof is easily available. As the frame, it is possible to use the honeycomb core material made of various materials such as aluminum honeycomb core, FRP honeycomb core, paper honeycomb core (manufactured by Shin Nippon Feather Core Co., Ltd, manufactured by Showa Aircraft Group Co., Ltd., or the like), thermoplastic resin (PP, PET, PE, PC, or the like) honeycomb core (TECCELL manufactured by Gifu Plastic Industry Co., Ltd., or the like).

In addition, a structure including air, that is, a foam material, a hollow material, a porous material, or the like can also be used as the frame material. In order to prevent the ventilation between cells in a case in which a large number of resonators are used, for example, a closed cell foam material and the like can be used to form the frame. For example, various materials such as closed cell polyurethane, closed cell polystyrene, closed cell polypropylene, closed cell polyethylene, and a closed cell rubber sponge can be selected. By using closed cell material, sound, water, gas, or the like is not allowed to pass through, and the structural strength is high as compared with an open cell material, and thus it is suitable for being used as the frame material. In addition, in a case in which the porous sound absorbing body described above has sufficient supportability, the frame may be formed only by the porous sound absorbing body, and examples of the porous sound absorbing body and the material of the frame are used in combination by for example, mixing or kneading. As described above, the weight of the device can be reduced by using the material system including air inside. In addition, the heat insulating property can be imparted.

Here, from the viewpoint of disposition at a high temperature position, it is preferable that the frame material be made of a material having higher heat resistance than the flame retardant material. The heat resistance can be defined, for example, by the time that satisfies each item of Article 108-2 of the Building Standards Law Enforcement Ordinance. In a case in which the time that satisfies each item of Article 108-2 of the Building Standards Law Enforcement Ordinance is 5 minutes or more and less than 10 minutes, it is a flame retardant material, in a case in which the time is 10 minutes or more and less than 20 minutes, it is a semi-incombustible material, and in a case in which the time is 20 minute or more, it is a non-combustible material. However, in many cases, the heat resistance is defined for each field. Therefore, the frame material need only be made of a material having the heat resistance equivalent to or higher than the flame retardance defined in the field in response to the field in which the blower with the silencer is used.

The wall thicknesses of the frame and the lid portion (frame thickness) are not particularly limited, and can be set in response to, for example, the size of the opening cross section of the frame.

Examples of the film 34 include various metals such as aluminum, titanium, nickel, permalloy, 42 alloy, kovar, nichrome, copper, beryllium, phosphor bronze, brass, nickel silver, tin, zinc, iron, tantalum, niobium, molybdenum, zirconium, gold, silver, platinum, palladium, steel, tungsten, lead, and iridium; and the resin materials such as polyethylene terephthalate (PET), triacetyl cellulose (TAC), polyvinylidene chloride (PVDC), polyethylene (PE), polyvinyl chloride (PVC), polymethylpentene (PMP), cycloolefin polymer (COP), zeonoa, polycarbonate, polyethylene naphthalate (PEN), polypropylene (PP), polystyrene (PS), polyarylate (PAR), aramid, polyphenylene sulfide (PPS), polyether sulfone (PES), nylon, polyester (PEs), cyclic olefin copolymer (COC), diacetyl cellulose, nitro cellulose, cellulose derivative, polyamide, polyamide-imide, polyoxymethylene (POM), polyetherimide (PEI), polyrotaxane (slide ring material or the like), and polyimide. Further, a glass material such as thin film glass and a fiber reinforced plastic material such as carbon fiber reinforced plastic (CFRP) and glass fiber reinforced plastic (GFRP) can also be used. In addition, natural rubber, chloroprene rubber, butyl rubber. EPDM, and silicone rubber, and rubber having these crosslinked structures can be used. Alternatively, the combination thereof may be used.

In addition, in a case in which the metal material is used, the surface may be metal-plated from the viewpoint of suppressing rust.

From the viewpoint of excellent durability against heat, ultraviolet rays, external vibration, or the like, it is preferable to use the metal material as the material of the casing 16 in applications requiring durability.

In addition, a fixing method of the film or the lid portion to the frame is not particularly limited, and a method of using a double-sided tape or an adhesive, a mechanical fixing method such as screwing, crimping or the like can be appropriately used. The fixing method can also be selected from the viewpoints of heat resistance, durability, and water resistance as in the case of the frame material and the film.

For example, as the adhesive, "Super X" series manufactured by CEMEDINE Co., Ltd., "3700 series (heat resistant)" manufactured by ThreeBond Holdings Co., Ltd., heat resistant epoxy adhesive "Duralco series" manufactured by TAIYO WIRE CLOTH CO., LTD., and the like can be selected. In addition, as the double-sided tape, Ultra High Temperature Double Coated Tape 9077 manufactured by 3M or the like can be selected. As described above, various fixing methods can be selected for the required characteristic.

EXAMPLES

The present invention will be described below in more detail with reference to examples. The materials, the usage amounts, the ratios, the processing contents, the processing procedures, and the like shown in the following examples can be appropriately changed without departing from the spirit of the present invention. Therefore, the scope of the present invention should not be construed as being limited by the following examples.

Example 1

San Ace 60 (Model: 9GA0612G9001 manufactured by SANYO DENKI CO., LTD.) was used as the axial fan 12. This axial fan has an outer diameter of 60 mm×60 mm and a thickness of 10 mm, a shaft portion having a diameter of 31 mm, and a rotor having an outer diameter (diameter of rotation region) of 56 mm.

A configuration was adopted in which the silencer includes one Helmholtz resonator 40.

FIG. 29 is a schematic cross-sectional view of the Helmholtz resonator 40.

As shown in FIG. 29, a configuration was adopted in which the Helmholtz resonator 40 has an outer diameter of a columnar shape with a diameter of 31 mm and a thickness of 15 mm, an inner space of a columnar shape with a diameter of 26 mm and a thickness of 10 mm, and a through-hole with a diameter of 4.5 mm and a length of 3 mm formed in a center portion of one bottom surface. The Helmholtz resonator 40 was formed by using an acrylic plate.

The Helmholtz resonator 40 was attached to the cover portion of the casing of the axial fan 12 by using a double-sided tape ("GENBA NO CHIKARA" manufactured by ASKUL Corporation) to produce the blower with the silencer. In this case, the rotation axis of the axial fan 12 and the central axis of the Helmholtz resonator 40 coincided with each other. Therefore, a configuration was adopted in which the silencer is disposed to overlap with the shaft portion as a whole as viewed from the rotation axis direction.

In addition, the vibration direction of the vibrating body of the Helmholtz resonator 40 is 0°.

[Evaluation]
<Measurement of Silencing Volume>

A measuring method the silencing volume will be described with reference to FIGS. 26 and 27.

As shown in FIGS. 26 and 27, the blower with the silencer was disposed at one opening end portion of a duct DU such that the Helmholtz resonator 40 side faced the duct DU. The Helmholtz resonator 40 was disposed in the duct DU. In addition, a tubular urethane sponge UT was disposed on a side of the blower with the silencer opposite to the duct DU. A circumference of the axial fan 12 was covered with the urethane sponge UT. In addition, a microphone MK was disposed on the duct DU side. The microphone MK was disposed at a position 40 cm in the axial direction and 10 cm in the radial direction spaced from a center position of the axial fan 12.

The duct DU was made of acrylic, had a quadrangular cross section, and had an inner diameter of 6 cm×6 cm, an outer diameter of 15 cm×12 cm, and a length of 6 cm.

The urethane sponge UT (U00F2 manufactured by Fuji Gomu co. ltd.) had a quadrangular cross section and had an inner diameter of 12 cm×15 cm, an outer diameter of 30 cm×40 cm, and a length of 30 cm. By disposing the urethane sponge UT on the side opposite to the duct DU, the sound waves radiated from the side of the axial fan 12 opposite to the Helmholtz resonator 40 were reduced, and only the sound that passed through the duct DU was measured by the microphone MK.

Electric power was supplied to the axial fan 12 to rotate the rotor, and the sound pressure was measured with the microphone MK. A rotation speed of the axial fan 12 was 6682 rpm.

FIG. 30 shows a measurement result of a sound pressure intensity. FIG. 30 also shows the sound pressure intensity in a case of a single axial fan 12 without the resonator, as a reference.

In addition, a relationship between the frequency and the absorbance of the single Helmholtz resonator 40 was measured by a 4-microphone method using an acoustic pipe. This sound absorbance was measured according to JIS A 1405-2, and WinZac MTX manufactured by Nihon Onkyo Engineering Co., Ltd. can be used for the same measurement.

A relationship between the frequency and the absorbance of a film type resonator 30 is shown in FIG. 30.

From the results of the reference shown in FIG. 30, it was found that the frequency of the dominant sound of the axial fan was about 1225 Hz. On the other hand, it was found that the resonance frequency of the Helmholtz resonator 40 was 1184 Hz and the Helmholtz resonator 40 exhibited high absorbance for the dominant sound of the axial fan.

The silencing volume was calculated from a difference between the sound pressure intensity of the reference and the sound pressure intensity of Example 1.

The results are shown in FIG. 31. From FIG. 31, it was found that in Example 1 in which the silencer was provided, the dominant sound of the axial fan was silenced by 4 dB or more as compared with a case of the single axial fan.

<Measurement of Air Volume>

Next, a measuring method of the air volume will be described with reference to FIG. 28.

As shown in FIG. 28, an air volume anemometer TM (TM-413 manufactured by AS ONE Corporation) was disposed at the other opening end portion of the duct DU, and electric power was supplied to the axial fan 12 to rotate the rotor, and a wind speed was measured by the air volume meter TM. A rotation speed of the axial fan 12 was 6682 rpm.

The wind speed was 6.2 m/s in a case of the reference. On the other hand, the wind speed was 6.2 m/s in a case of Example 1. That is, the wind speed (air volume) was not reduced with respect to the reference.

Comparative Example 1

The sound pressure intensity was measured and the silencing volume was obtained in the same manner as in Example 1 except that a porous sound absorbing material (urethane sponge: U00F2 manufactured by Fuji Gomu co. ltd.) was disposed instead of the Helmholtz resonator.

The porous sound absorbing material had a columnar shape with a diameter of 31 mm and a thickness of 15 mm, and the central axis of the porous sound absorbing material was disposed to coincide with the rotation axis.

Comparative Example 2

The sound pressure intensity was measured and the silencing volume was obtained in the same manner as in Example 1 except that an acrylic block was disposed instead of the Helmholtz resonator.

The acrylic block had a columnar shape with a diameter of 31 mm and a thickness of 15 mm, and the central axis of the acrylic block was disposed to coincide with the rotation axis.

The results are shown in FIG. 32. The results of Example 1 are also shown in FIG. 32.

From FIGS. 31 and 32, it was found that in Comparative Examples 1 and 2, no silencing effect was obtained with respect to the frequency of the dominant sound. On the other hand, it was found that in Example of the present invention, the dominant sound of the axial fan could be silenced, and even in a case in which the silencer was disposed, the wind speed was not reduced and the air volume could be ensured. In addition, it was found that since it was not necessary to separately provide a space for installing the silencer, it was possible to suppress an increase in the size of the entire device in which the fan and the silencer were installed.

Example 1-2

Next, in Example 1, a result of a study conducted by changing the length of the duct DU (hereinafter referred to as a duct length) will be described.

In cases in which the length of the duct DU was 0 cm (that is, without a duct), 3 cm, and 18 cm, the sound pressure intensity was measured in the same manner as described above and the silencing volume was obtained.

The results are shown in FIG. 33. In addition, FIG. 34 is a graph showing a relationship between the silencing volume and the duct length at 1225 Hz.

From FIGS. 33 and 34, it was found that the silencing effect of 1.5 dB or more could be obtained regardless of the presence or absence of the duct. In addition, it was found that the silencing volume is increased in a case in which the duct length is 5 cm or more.

Example 1-3

Next, a result of a study conducted by changing only the outer diameter of the silencer (Helmholtz resonator) in Example 1 will be described. Specifically, by changing the outer diameter of the silencer, an area ratio of the region in which the blade region and the silencer overlap with each other to the blade region was changed, and the effect was studied.

In a case of Example 1, since the diameter of the shaft portion and the diameter of the silencer are the same, the area ratio (hereinafter, also referred to as a shielded area) of the region in which the blade region and the silencer overlap with each other to the blade region was 0%.

The outer diameter of the silencer was changed to produce the shielded area 7.4%, 24.2%, and 58.3%, respectively, and the air volume was measured in the same manner as in the above. Note that the duct length was 6 cm.

The results are shown in FIG. 35.

From FIG. 35, it was found that the air volume was reduced as the shielded area was increased. In addition, from an approximate expression of the measurement results, it was found that the air volume of 80% or more could be ensured by setting the shielded area to 52% or less.

Example 2

An evaluation was performed in the same manner as in Example 1 except that a configuration was adopted in which the Helmholtz resonator 40 was provided instead of the film type resonator 30.

FIG. 36 is a schematic cross-sectional view of the film type resonator 30.

As shown in FIG. 36, the frame 32 is made of acrylic, has a columnar shape with an outer shape of 34 mm in diameter and a height of 12 mm, and has a columnar opening portion on one bottom surface, and the opening portion has a diameter of 30 mm and a depth of 10 mm. In addition, the film 34 was a 125 μm PET film.

The outer diameter of the film type resonator 30 was larger than the outer diameter of the shaft portion, and the shielded area was 9.0%.

The vibration direction of the vibrating body of the film type resonator 30 was 0°.

The measurement results of the sound pressure intensity and obtaining the silencing volume in the same manner as in Example 1 are shown in FIG. 37. In addition, the measurement results of the relationship between the frequency and the absorbance of the single film type resonator by the 4-microphone method using the acoustic pipe are also shown in FIG. 37.

Note that the rotation speed of the axial fan 12 was 6245 rpm. The frequency of the dominant sound of the axial fan was about 1145 Hz in this case.

From FIG. 37, it was found that in Example 2 in which the silencer was provided, the dominant sound of the axial fan was silenced by 5 dB or more as compared with a case of the single axial fan.

In addition, the wind speed was measured in the same manner as in Example 1. The rotation speed of the axial fan 12 was 6245 rpm. The wind speed was 5.8 m/s in a case of the reference. The wind speed was 5.7 m/s in a case of Example 2. That is, the wind speed (air volume) was 98.3% with respect to the reference.

From the above results, it was found that in Example 2 as well, the dominant sound of the axial fan could be silenced, and even in a case in which the silencer was disposed, the wind speed was not reduced and the air volume could be ensured. In addition, it was found that since it was not necessary to separately provide a space for installing the silencer, it was possible to suppress an increase in the size of the entire device in which the fan and the silencer were installed.

Example 3

An evaluation was performed in the same manner as in Example 2 except that the film type resonator was changed to a film type resonator having a shape as shown in FIG. 38.

As shown in FIG. 38, the frame 32 was made of acrylic, had a cubic shape, had an outer shape of 21 mm×21 mm×21 mm, had an opening portion penetrating two opposing surfaces, and had a cross section of the opening portion having a square shape of 17 mm×17 mm. In addition, the film 34 was disposed on the two opening surfaces. The film 34 was the 125 μm PET film.

This film type resonator was disposed in the casing of the axial fan 12 in a state shown in FIG. 5. That is, the film type resonator was disposed such that the vibration direction of the vibrating body of the film type resonator was 90°.

The measurement results of the sound pressure intensity and obtaining the silencing volume in the same manner as in Example 1 are shown in FIG. 39. In addition, the measurement results of the relationship between the frequency and the absorbance of the single film type resonator by the 4-microphone method using the acoustic pipe are also shown in FIG. 39.

Note that the rotation speed of the axial fan 12 was 4200 rpm. The frequency of the dominant sound of the axial fan was about 1540 Hz in this case. Note that the dominant sound is a secondary peak sound.

From FIG. 39, it was found that in Example 3 in which the silencer was provided, the dominant sound of the axial fan was silenced by 4 dB or more as compared with a case of the single axial fan.

In addition, the wind speed was measured in the same manner as in Example 1. The rotation speed of the axial fan 12 was 4200 rpm. The wind speed was 3.8 m/s in a case of the reference. The wind speed was 3.8 m/s in a case of Example 3. That is, the wind speed (air volume) was not reduced with respect to the reference.

From the above results, it was found that in Example 3 as well, the dominant sound of the axial fan could be silenced, and even in a case in which the silencer was disposed, the wind speed was not reduced and the air volume could be ensured. In addition, it was found that since it was not necessary to separately provide a space for installing the silencer, it was possible to suppress an increase in the size of the entire device in which the fan and the silencer were installed.

From the results described above, the effect of the present invention is clear.

EXPLANATION OF REFERENCES

10: blower with silencer
12: axial fan
14: motor
16: casing
16a: support portion
16b: wind tunnel portion
16c: cover portion
16d: connecting portion
16e: hole
18: rotor
20: shaft portion
22: blade
28: silencer
30: film type resonator
32, 32b to 32e, 42: frame
34: film
36: connection frame
38: seat
40: Helmholtz resonator
44: lid portion
46: through-hole
48: porous sound absorbing material
DU: duct
UT: urethane sponge
MK: microphone
AC: acrylic plate
TM: anemometer
$H_1$: thickness of axial fan
$H_2$: thickness of silencer

What is claimed is:

1. A blower with a silencer, the blower comprising:
an axial fan including a casing, a motor attached to the casing, and a rotor having a shaft portion attached to the motor and rotated and a blade formed to protrude to an outer side of the shaft portion in a radial direction; and
the silencer attached to the casing,
wherein the silencer includes a resonator,
the silencer is disposed at a position in which at least a part of the silencer overlaps with the shaft portion, as viewed from a rotation axis direction of the rotor,
a circle around a rotation axis of the rotor, which has a radius of a line connecting the rotation axis and a point of a most distal end of the blade as viewed from the rotation axis direction, is defined as a rotation region, and an area of the silencer is smaller than an area of the rotation region as viewed from the rotation axis direction, and
with an outward direction of the rotation axis direction being 0° and an inward direction of the rotation axis direction being 180°, an angle of a vibration direction of a vibrating body of the resonator to the rotation axis is within 90°.

2. The blower with a silencer according to claim 1, wherein a thickness of the silencer in the rotation axis direction is within three times a thickness of the axial fan.

3. The blower with a silencer according to claim 1, wherein the resonator is a film type resonator.

4. The blower with a silencer according to claim 1, wherein the silencer includes a porous sound absorbing material.

5. The blower with a silencer according to claim 1, wherein the silencer includes a plurality of the resonators.

6. The blower with a silencer according to claim 5, wherein any two of the plurality of resonators have different resonant frequencies from each other.

7. The blower with a silencer according to claim 1, wherein the silencer is disposed to overlap with the shaft portion as a whole, as viewed from the rotation axis direction.

8. The blower with a silencer according to claim 7, wherein the area of the silencer in a cross section perpendicular to the rotation axis is 70% or more of an area of the shaft portion.

9. The blower with a silencer according to claim 1, wherein a region excluding a region of the shaft portion from the rotation region, as viewed from the rotation axis direction, is defined as a blade region, and a ratio of an area of a region in which the blade region and the silencer overlap with each other to an area of the blade region is defined as a shielded area, and the shielded area is 52% or less.

10. The blower with a silencer according to claim 9, wherein the silencer is disposed to overlap with the shaft portion as a whole, as viewed from the rotation axis direction.

11. The blower with a silencer according to claim 9, wherein a thickness of the silencer in the rotation axis direction is within three times a thickness of the axial fan.

12. The blower with a silencer according to claim 9, wherein the silencer includes a plurality of the resonators.

13. The blower with a silencer according to claim 12, wherein any two of the plurality of resonators have different resonant frequencies from each other.

* * * * *